US012615276B2

(12) United States Patent
Adachi et al.

(10) Patent No.: US 12,615,276 B2
(45) Date of Patent: Apr. 28, 2026

(54) ANOMALY DETECTION DEVICE AND ANOMALY DETECTION METHOD

(71) Applicant: Panasonic Intellectual Property Corporation of America, Torrance, CA (US)

(72) Inventors: Takahiro Adachi, Hyogo (JP); Yoshihiro Ujiie, Tokyo (JP); Takeshi Kishikawa, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 44 days.

(21) Appl. No.: 18/766,200

(22) Filed: Jul. 8, 2024

(65) Prior Publication Data

US 2024/0364727 A1     Oct. 31, 2024

Related U.S. Application Data

(63) Continuation of application No. PCT/JP2022/047828, filed on Dec. 26, 2022.

(30) Foreign Application Priority Data

Jan. 14, 2022     (JP) ................................. 2022-004257

(51) Int. Cl.
*G06F 11/07*          (2006.01)
*H04L 9/40*           (2022.01)

(52) U.S. Cl.
CPC ............................... *H04L 63/1425* (2013.01)

(58) Field of Classification Search
CPC ....... H04L 63/1425; H04L 2012/40215; H04L 2012/40273; H04L 12/12; H04L 12/28;

(Continued)

(56) References Cited

U.S. PATENT DOCUMENTS 9,274,511 B2 *    3/2016   Tsukidate ............ G06F 11/0739
2019/0217869 A1   7/2019   Takeuchi et al.
(Continued)

FOREIGN PATENT DOCUMENTS

JP      2019-146145     8/2019
WO     2021/177319     9/2021

OTHER PUBLICATIONS

International Search Report (ISR) from International Searching Authority (Japan Patent Office) in International Pat. Appl. No. PCT/JP2022/047828, dated Mar. 14, 2023, together with an English language translation.

(Continued)

*Primary Examiner* — Amie C. Lin
(74) *Attorney, Agent, or Firm* — Greenblum & Bernstein, P.L.C.

(57)          ABSTRACT

An anomaly detection device detects an anomaly in an in-vehicle network system including two or more electronic control units and one or more networks and includes: ECU attribute storage in which attributes of the two or more electronic control units each of which has been set for a corresponding one of the two or more electronic control units are stored; a communicator that transmits and receives a message on the one or more networks; and an anomaly detector that detects anomalous communication by using an attribute of a message source electronic control unit or an attribute of a message destination electronic control unit among the attributes stored in the ECU attribute storage. The attribute stored in the ECU attribute storage indicates the function of the electronic control unit including the attribute or the type of information that is handled by the electronic control unit including the attribute.

13 Claims, 25 Drawing Sheets

(58) Field of Classification Search
CPC ... H04L 12/40; H04L 41/0686; H04L 41/069;
H04L 12/66; H04L 41/0803; G06F
11/0739; G06F 11/0751; B60R 16/0231;
H04W 4/48
See application file for complete search history.

(56) References Cited

U.S. PATENT DOCUMENTS

| | | | |
|---|---|---|---|
| 2019/0239221 A1* | 8/2019 | Ujiie | H04L 12/40 |
| 2019/0300011 A1* | 10/2019 | Nakano | G07C 5/02 |
| 2020/0204395 A1* | 6/2020 | Takahashi | H04L 63/1425 |
| 2022/0038307 A1* | 2/2022 | Yasunori | B60W 60/001 |
| 2022/0201039 A1* | 6/2022 | Risso | H04L 63/0823 |
| 2022/0338013 A1 | 10/2022 | Maeda et al. | |

OTHER PUBLICATIONS

Herold et al., "Anomaly Detection for SOME/IP using Complex
Event Processing", IEEE/IFIP NOMS 2016 Workshop, IEEE/IFIP
Network Operations and Management Symposium, 2016, pp. 1221-
1226.
Extended European Search Report (EESR) from European Patent
Office (EPO) in European Patent Appl. No. 22920628.9, dated Apr.
3, 2025.

* cited by examiner

External network 20

100

TCU

External communicator ~ 101

Converter ~ 102

Internal communicator ~ 103

Central ECU 200

200

Central ECU

Guest OS part ~ 203

Host OS part ~ 202

Communicator ~ 201

User interface ECU 300          TCU 100          Anomaly detection ECU 400          Zone ECU 500a/ zone ECU 500b/ camera ECU 600e

300

User interface ECU

External device connector ~302

Communicator ~301

Central ECU 200

400

Anomaly detection ECU

403
Communication log generator

407
Anomaly detection rule storage

402
Anomaly detector

405
ECU attribute setter

404
Communication log storage

406
ECU attribute storage

Communicator ~401

Central ECU 200

500a
Zone ECU

Host part — 501

Communicator — 502

Central
ECU 200

Brake control
ECU 600a

Vehicle speed
ECU 600b

600a
Brake control ECU

External device connector — 603

Host part — 602

Communicator — 601

CAN 1

FIG. 8

| Message ID(Service ID / Method ID) [32bit] (=0xFFFF 8100) | | | SOME/IP header |
| --- | --- | --- | --- |
| Length [32bit] | | | |
| Request ID (Client ID / Session ID) [32bit] | | | |
| Protocol Version [8bit] (=0x01) | Interface Version [8bit] (=0x01) | Message Type [8bit] (=0x02) | Return Code [8bit] (=0x00) |
| Flags [8bit] | Reserved [24bit] | | SOME/IP SD |
| Length of Entries Array in Bytes [32bit] | | | |
| Entries Array [Variable size] | | | |
| Length of Options Array in Bytes [32bit] | | | |
| Options Array [Variable size] | | | |

FIG. 9

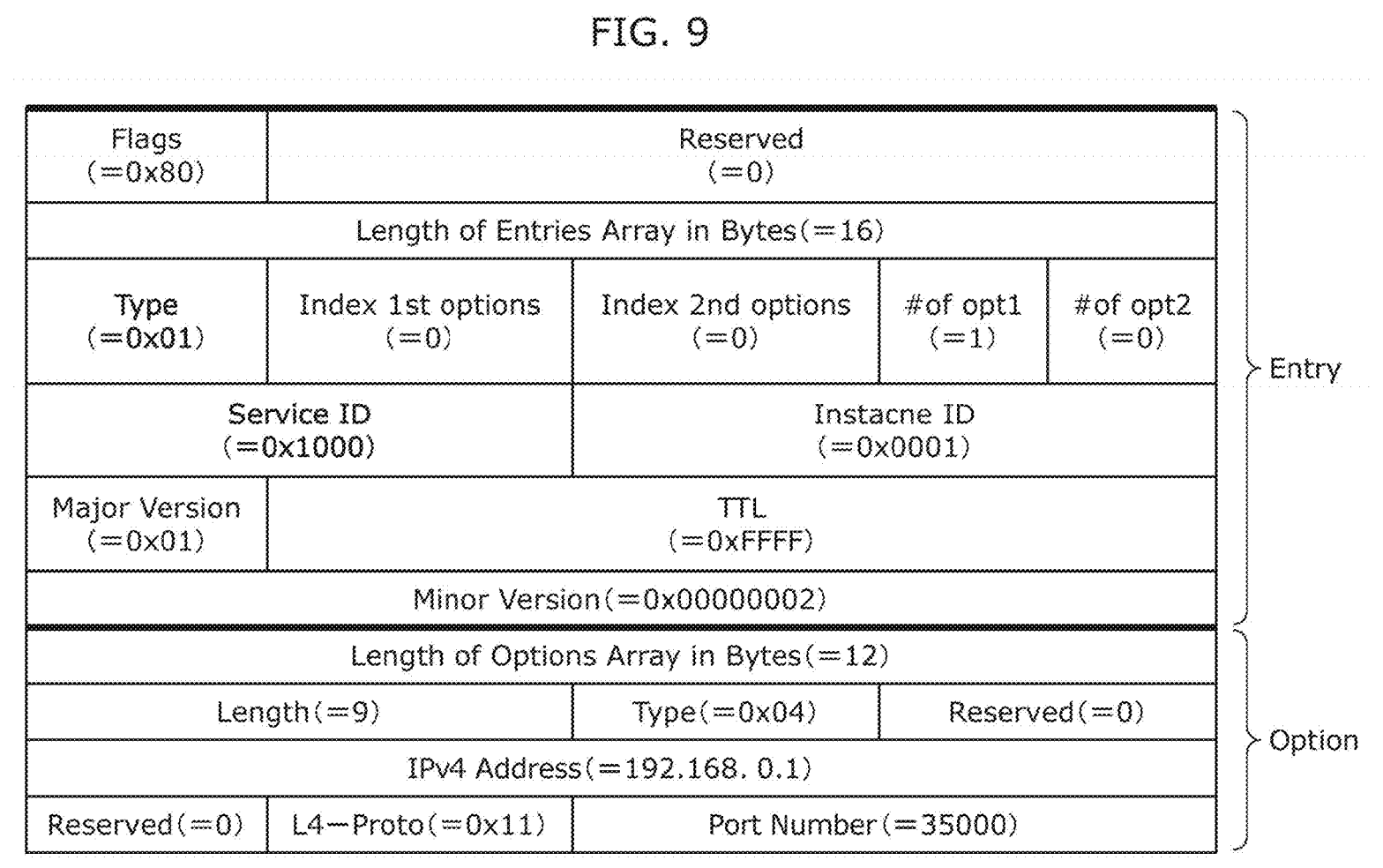

| Entry | | | |
|---|---|---|---|
| Flags (=0x80) | Reserved (=0) | | |
| Type (=0x01) | Length of Entries Array in Bytes (=16) | | |
| | Index 1st options (=0) | Index 2nd options (=0) | #of opt1 (=1) | #of opt2 (=0) |
| Service ID (=0x1000) | Instacne ID (=0x0001) | | |
| Major Version (=0x01) | TTL (=0xFFFF) | | |
| Minor Version (=0x00000002) | | | |

| Option | | |
|---|---|---|
| Length of Options Array in Bytes (=12) | | |
| Length (=9) | Type (=0x04) | Reserved (=0) |
| Reserved (=0) | L4-Proto (=0x11) | IPv4 Address (=192.168. 0.1) |
| | | Port Number (=35000) |

FIG. 10

| Timestamp | Source IP address | Destination IP address | Source port | Destination port | Transport protocol | Service ID | Method ID | Message type | Message size |
|---|---|---|---|---|---|---|---|---|---|
| T1 | X | A | X1 | A1 | UDP | 0001 | 0001 | Notification | 1458 |
| T2 | X | B | X2 | B1 | UDP | 0001 | 0001 | Notification | 1458 |
| T3 | Y | C | Y1 | C1 | TCP | 0002 | 0001 | Request | 358 |
| T4 | C | Y | C1 | Y1 | TCP | 0002 | 0001 | Response | 358 |
| ... | ... | ... | ... | ... | ... | ... | ... | ... | |

FIG. 11

| IP address | ECU attribute | | | | | | | | Attribute setting flag | Flag-OFF setting date and time | Flag-ON setting date and time |
| | Role attribute of ECU | | | Domain attribute of ECU | | | | | | | |
| | Sensor | Brain | Actuator | Connectivity | Powertrain | ADAS | Body | Infotainment | | | |
|---|---|---|---|---|---|---|---|---|---|---|---|
| 192.168.1.1 (Brake control ECU) | 0 | 1 | 0 | 0 | 1 | 0 | 0 | 0 | OFF | 1636934400 | 1635930000 |
| 192.168.1.2 (Vehicle speed detection ECU) | 1 | 0 | 0 | 0 | 1 | 0 | 0 | 0 | OFF | 1636934450 | 1635930100 |
| 192.168.1.11 (Electric lock control ECU) | 0 | 1 | 0 | 0 | 0 | 0 | 1 | 0 | OFF | 1636936500 | 1636362000 |
| 192.168.1.12 (Electric lock open/close ECU) | 0 | 0 | 1 | 0 | 0 | 0 | 1 | 0 | OFF | 1636936550 | 1636362100 |
| 192.168.1.21 (Camera ECU) | 1 | 0 | 0 | 0 | 0 | 1 | 0 | 0 | OFF | 1635757200 | 1609459200 |
| 192.168.1.22 (Guest OS part) | 0 | 1 | 0 | 0 | 0 | 1 | 0 | 0 | ON | 1635757200 | 1637366400 |
| ⋮ | ⋮ | ⋮ | ⋮ | ⋮ | ⋮ | ⋮ | ⋮ | ⋮ | ⋮ | ⋮ | ⋮ |

FIG. 12

| ECU attribute of source ECU | ECU attribute of destination ECU | Connectivity | | | ADAS | | | Powertrain | | | Body | | | Infotainment | | |
|---|---|---|---|---|---|---|---|---|---|---|---|---|---|---|---|---|
| | | Sensor | Brain | Actuator | Sensor | Brain | Actuator | Sensor | Brain | Actuator | Sensor | Brain | Actuator | Sensor | Brain | Actuator |
| Connectivity | Sensor | NG | OK | NG | NG | OK | NG | NG | NG | NG | NG | OK | NG | NG | OK | NG |
| | Brain | OK | OK | OK | OK | OK | OK | NG | NG | NG | OK | OK | NG | OK | OK | OK |
| | Actuator | NG | OK | NG | NG | OK | NG | NG | NG | NG | NG | OK | NG | NG | OK | NG |
| ADAS | Sensor | NG | OK | NG | NG | OK | NG | NG | OK | NG | NG | OK | NG | NG | OK | NG |
| | Brain | OK | OK | OK | OK | OK | OK | OK | OK | OK | OK | OK | NG | OK | OK | OK |
| | Actuator | NG | OK | NG | NG | OK | NG | NG | OK | NG | NG | OK | NG | NG | OK | NG |
| Powertrain | Sensor | NG | NG | NG | NG | OK | NG | NG | OK | NG | NG | OK | NG | NG | OK | NG |
| | Brain | NG | NG | NG | OK | OK | OK | OK | OK | OK | OK | OK | NG | OK | OK | NG |
| | Actuator | NG | NG | NG | NG | OK | NG | NG | OK | NG | NG | OK | NG | NG | OK | OK |
| Body | Sensor | NG | OK | NG | NG | OK | NG | NG | OK | NG | NG | OK | NG | NG | OK | NG |
| | Brain | OK | OK | OK | OK | OK | OK | OK | OK | NG | OK | OK | OK | OK | OK | NG |
| | Actuator | NG | OK | NG | NG | OK | NG | NG | OK | NG | NG | OK | NG | NG | OK | OK |
| Infotainment | Sensor | NG | OK | NG | NG | OK | NG | NG | OK | NG | NG | OK | NG | NG | OK | NG |
| | Brain | OK | OK | OK | OK | OK | OK | OK | OK | NG | OK | OK | OK | OK | OK | NG |
| | Actuator | NG | OK | NG | NG | OK | NG | NG | NG | NG | NG | OK | NG | NG | OK | NG |

FIG. 20

| ECU attribute of ECU at source IP address | Frame | Message size (Byte) | |
|---|---|---|---|
| | | Minimum value | Maximum value |
| Connectivity | Sensor | 500 | 600 |
| | Brain | 600 | 1450 |
| | Actuator | 200 | 300 |
| ADAS | Sensor | 1450 | 1450 |
| | Brain | 1200 | 1450 |
| | Actuator | 500 | 1450 |
| Powertrain | Sensor | 300 | 400 |
| | Brain | 500 | 800 |
| | Actuator | 300 | 400 |
| Body | Sensor | 200 | 250 |
| | Brain | 400 | 500 |
| | Actuator | 200 | 250 |
| Infotainment | Sensor | 300 | 400 |
| | Brain | 750 | 1450 |
| | Actuator | 1450 | 1450 |

FIG. 24

| IP address | ECU attribute | | | | | | | | Attribute setting flag | Flag-OFF setting date and time | Flag-ON setting date and time |
| --- | --- | --- | --- | --- | --- | --- | --- | --- | --- | --- | --- |
| | Role attribute of ECU | | | | Domain attribute of ECU | | | | | | |
| | Sensor | Brain | Actuator | Connectivity | Powertrain | ADAS | Body | Infotainment | | | |
| 192.168.1.1 (Brake control ECU) | 0 | 1 | 0 | 0 | 0.8 | 0.1 | 0.1 | 0 | OFF | 1636934400 | 1635930000 |
| 192.168.1.2 (Vehicle speed detection ECU) | 1 | 0 | 0 | 0 | 0.7 | 0.2 | 0.1 | 0 | OFF | 1636934450 | 1635930100 |
| 192.168.1.11 (Electric lock control ECU) | 0 | 1 | 0 | 0 | 0.1 | 0 | 0.9 | 0 | OFF | 1636936500 | 1636362000 |
| 192.168.1.12 (Electric lock open/close ECU) | 0 | 0 | 1 | 0 | 0 | 0 | 1 | 0 | OFF | 1636936550 | 1636362100 |
| 192.168.1.21 (Camera ECU) | 1 | 0 | 0 | 0 | 0 | 1 | 0 | 0 | OFF | 1635757200 | 1609459200 |
| 192.168.1.22 (Guest OS part) | 0 | 1 | 0 | 0 | 0.1 | 0.6 | 0 | 0.3 | ON | 1635757200 | 1637366400 |
| ⋮ | ⋮ | ⋮ | ⋮ | ⋮ | ⋮ | ⋮ | ⋮ | ⋮ | ⋮ | ⋮ | ⋮ |

FIG. 27

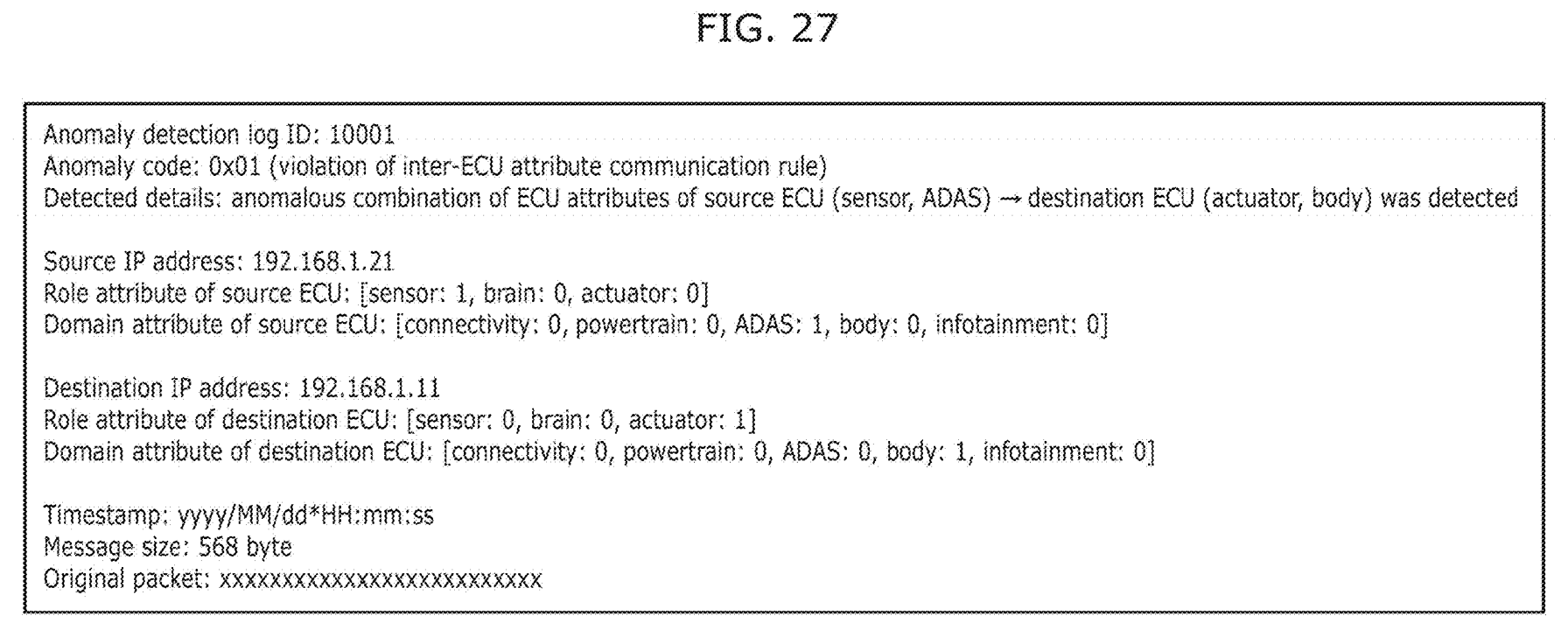

Anomaly detection log ID: 10001
Anomaly code: 0x01 (violation of inter-ECU attribute communication rule)
Detected details: anomalous combination of ECU attributes of source ECU (sensor, ADAS) → destination ECU (actuator, body) was detected Source IP address: 192.168.1.21
Role attribute of source ECU: [sensor: 1, brain: 0, actuator: 0]
Domain attribute of source ECU: [connectivity: 0, powertrain: 0, ADAS: 1, body: 0, infotainment: 0]

Destination IP address: 192.168.1.11
Role attribute of destination ECU: [sensor: 0, brain: 0, actuator: 1]
Domain attribute of destination ECU: [connectivity: 0, powertrain: 0, ADAS: 0, body: 1, infotainment: 0]

Timestamp: yyyy/MM/dd*HH:mm:ss
Message size: 568 byte
Original packet: xxxxxxxxxxxxxxxxxxxxxxxxxxxxxx

FIG. 28

ANOMALY DETECTION DEVICE AND ANOMALY DETECTION METHOD

CROSS REFERENCE TO RELATED APPLICATIONS

This is a continuation application of PCT International Application No. PCT/JP2022/047828 filed on Dec. 26, 2022, designating the United States of America, which is based on and claims priority of Japanese Patent Application No. 2022-004257 filed on Jan. 14, 2022. The entire disclosures of the above-identified applications, including the specifications, drawings and claims are incorporated herein by reference in their entirety.

FIELD

The present disclosure relates to anomaly detection devices and anomaly detection methods for detecting an anomaly in an in-vehicle network system.

BACKGROUND

Non Patent Literature (NPL) 1 discloses a technology in which for SOME/IP frames, a destination IP address and a source IP address corresponding to service ID are set in advance as a normal rule, and frames are monitored so that a frame failing to comply with the normal rule can be detected as an anomalous frame.

CITATION LIST

Non Patent Literature

NPL 1: N. Herold, et al., "Anomaly Detection for SOME/IP using Complex Event Processing," NOMS2016. IEEE/IFIP Network Operations and Management Symposium, 2016

SUMMARY

Technical Problem

The present disclosure has an object to provide an anomaly detection device and an anomaly detection method that enable detection of anomalous communication by distinguishing whether unusual communication is communication performed by an attacker and with which the overall vehicle safety can improve.

Solution to Problem

An anomaly detection device according to one aspect of the present disclosure is an anomaly detection device that detects an anomaly in an in-vehicle network system including two or more electronic control units and one or more networks. The anomaly detection device includes: electronic control unit (ECU) attribute storage in which attributes of the two or more electronic control units are stored, each of the attributes being set for a corresponding one of the two or more electronic control units; a communicator that transmits and receives a message on the one or more networks; and an anomaly detector that detects anomalous communication by using an attribute of a message source electronic control unit or an attribute of a message destination electronic control unit among the attributes stored in the ECU attribute storage, the message source electronic control unit being one of the two or more electronic control units that is a source of the message, the message destination electronic control unit being one of the two or more electronic control units that is a destination of the message. Each of the attributes stored in the ECU attribute storage indicates a function of a corresponding one of the two or more electronic control units that includes the attribute or a type of information that is handled by the corresponding one of the two or more electronic control units that includes the attribute.

An anomaly detection method according to one aspect of the present disclosure is an anomaly detection method for detecting an anomaly in an in-vehicle network system including two or more electronic control units and one or more networks. The anomaly detection method includes: transmitting and receiving a message on the one or more networks; and detecting anomalous communication by using an attribute of a message source electronic control unit or an attribute of a message destination electronic control unit among attributes of the two or more electronic control units, the message source electronic control unit being one of the two or more electronic control units that is a source of the message, the message destination electronic control unit being one of the two or more electronic control units that is a destination of the message, each of the attributes being set for a corresponding one of the two or more electronic control units. Each of the attributes indicates a function of a corresponding one of the two or more electronic control units that includes the attribute or a type of information that is handled by the corresponding one of the two or more electronic control units that includes the attribute.

Note that these general or specific aspects may be implemented using a system, a method, an integrated circuit, a computer program, or a non-transitory computer-readable recording medium such as compact disc read-only memory (CD-ROM), or any combination of systems, methods, integrated circuits, computer programs, and non-transitory recording media.

Advantageous Effects

According to the present disclosure, it is possible to detect anomalous communication by distinguishing whether unusual communication is communication performed by an attacker, and the overall vehicle safety can improve.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 8 is a diagram illustrating one example of a SOME/IP SD message format according to Embodiment 1.

FIG. 9 is a diagram illustrating one example of a SOME/IP SD message according to Embodiment 1.

FIG. 10 is a diagram illustrating one example of a communication log stored in a communication log storage in Embodiment 1.

FIG. 11 is a diagram illustrating one example of ECU attribute information according to Embodiment 1.

FIG. 12 is a diagram illustrating one example of an anomaly detection rule using an ECU attribute in Embodiment 1.

FIG. 20 is a diagram illustrating one example of an anomaly detection rule based on ECU attributes according to Variation 1 of Embodiment 1.

FIG. 24 is a diagram illustrating one example of ECU attribute information according to Variation 3 of Embodiment 1.

FIG. 27 is a diagram illustrating one example of a log that is reported when an anomaly is detected in another variation.

FIG. 28 is a diagram illustrating one example of an anomaly detection result displayed on a graphical user interface in another variation.

DESCRIPTION OF EMBODIMENTS

Figure 1:
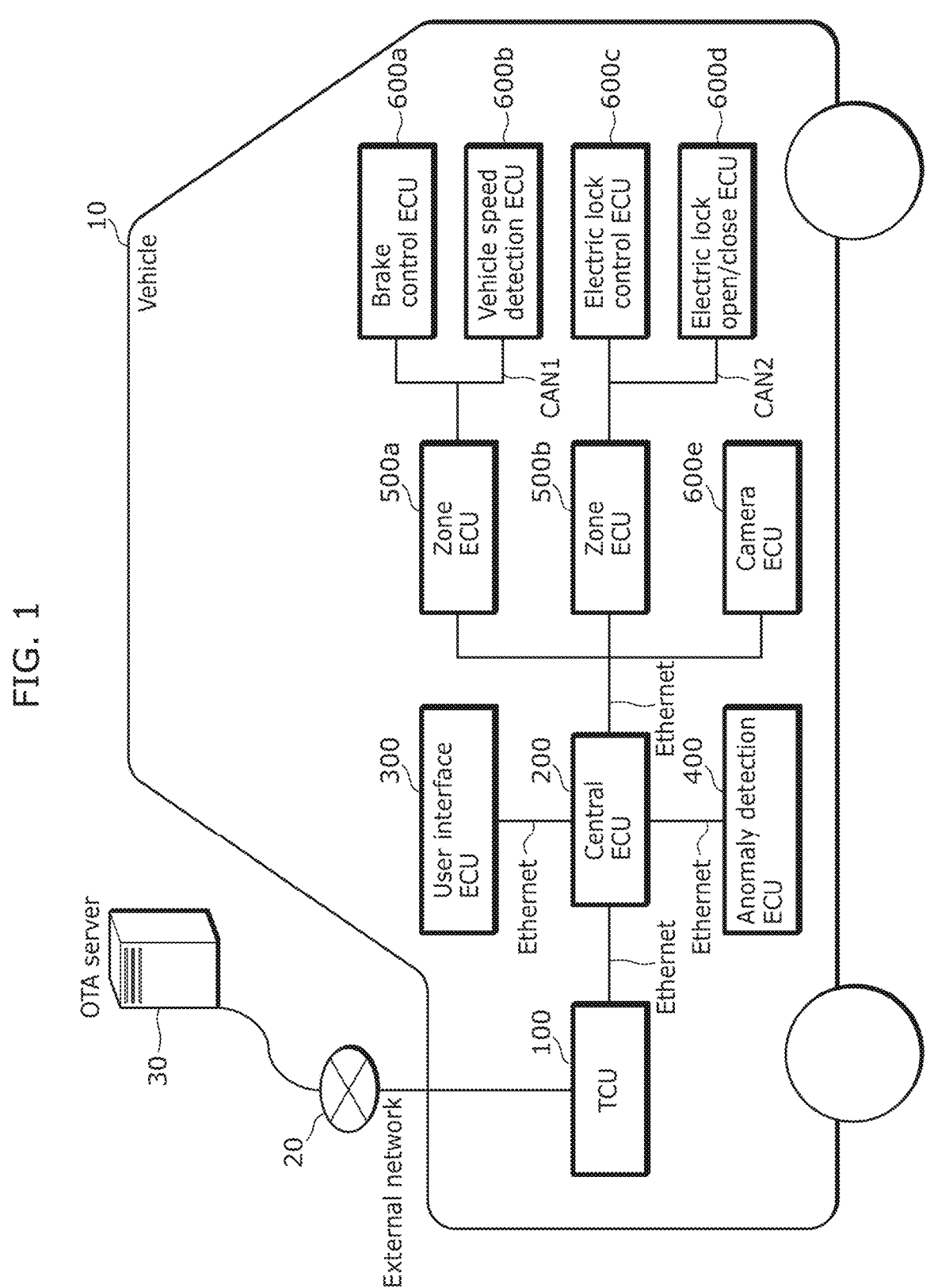
FIG. 1 is a diagram illustrating one example of the overall configuration of an in-vehicle network system according to Embodiment 1.

Underlying Knowledge Forming Basis of the Present Disclosure

Recent years have seen a large number of devices called electronic control units (ECUs) installed in automotive interior systems; a network connecting these ECUs is called an in-vehicle network.

There are numerous standards for the in-vehicle network. For example, there are in-vehicle networks that use Ethernet (registered trademark) defined in the IEEE 802.3, and in the advanced driver-assistance systems and the self-driving technology, a vast amount of information needs to be processed; thus, Ethernet which achieves a high data transmission rate is being introduced.

There is a standard called Scalable service-Oriented MiddlewarE over IP (SOME/IP) as a communication protocol on Ethernet. In SOME/IP, since each ECU connected to Ethernet determines communication content by service ID indicated in a header, communication is referred to as service-oriented communication.

According to SOME/IP, when the service ID of a demanded service or the service ID of an available service are stored in advance, the IP address, the MAC address, etc., of a communication counterpart ECU can be dynamically obtained to perform communication. This means that developers are not required to set, in advance, information dependent on system environments, such as IP addresses and MAC addresses, and can easily design highly portable software.

Furthermore, more and more in-vehicle network systems are being updated online by over the air (OTA), and it is expected that the content of development of in-vehicle applications, update programs, and the like can be easily reflected in vehicles and in-vehicle networks will have more dynamically changing communication tendencies.

In service-oriented communication represented by SOME/IP or the like, since there is no system for authenticating a source, there may be the following threat: if one ECU is falsely impersonated, unauthorized transmission and reception through communication using the service ID transmitted and received by the impersonated ECU become possible and moreover, for communication including the service ID transmitted by an ECU different from the impersonated ECU, the impersonated ECU can impersonate said different ECU to make unauthorized communication possible or stop communication, for example.

A known technique for dealing with such threat is that for SOME/IP frames, a destination IP address and a source IP address corresponding to service ID are set in advance as a normal rule, and frames are monitored so that a frame failing to comply with the normal rule can be detected as an anomalous frame, as disclosed in NPL 1.

However, when an in-vehicle application, an ECU update program, or the like is installed on a vehicle by OTA, the communication tendency of the in-vehicle network changes. This change is considered to specifically include (i) a situation in which a new function is added and two ECUs perform communication that has not been performed before and (ii) a situation in which an existing function is deleted and two ECUs perform new communication or no longer perform communication that has been performed so far.

In such a case, if the approach of setting normal communication connection in advance using the IP address, the MAC address, or the like of a source ECU or a destination ECU, as disclosed in NPL 1, is used, the detection rule needs to be updated every time an in-vehicle application, an ECU update program, or the like is installed on a vehicle by OTA, and thus it is difficult to maintain the accuracy of anomaly detection at a high level.

The present disclosure has an object to provide a safer in-vehicle network system with an anomaly detection ECU that classifies communication tendencies and communication content of ECUs according to a change in an in-vehicle network and functions to detect an anomaly using the classification result.

An anomaly detection device according to the first aspect of the present disclosure is an anomaly detection device that detects an anomaly in an in-vehicle network system including two or more electronic control units and one or more networks. The anomaly detection device includes: electronic control unit (ECU) attribute storage in which attributes of the two or more electronic control units are stored, each of the attributes being set for a corresponding one of the two or more electronic control units; a communicator that transmits and receives a message on the one or more networks; and an anomaly detector that detects anomalous communication by using an attribute of a message source electronic control unit or an attribute of a message destination electronic control unit among the attributes stored in the ECU attribute storage, the message source electronic control unit being one of the two or more electronic control units that is a source of the message, the message destination electronic control unit being one of the two or more electronic control units that is a destination of the message. Each of the attributes stored in the ECU attribute storage indicates a function of a corresponding one of the two or more electronic control units that includes the attribute or a type of information that is handled by the corresponding one of the two or more electronic control units that includes the attribute.

With this, when electronic control units are transferring a message, whether the message being transferred is anomalous can be determined by referring to the attributes indicating the function of each of the electronic control units and the type of information that is handled by the electronic control unit; thus, it is possible to improve vehicle safety.

An anomaly detection device according to the second aspect of the present disclosure is the anomaly detection device according to the first aspect of the present disclosure in which each of the attributes stored in the ECU attribute storage indicates the function of the corresponding one of the two or more electronic control units that operates in the in-vehicle network system, and the attributes stored in the ECU attribute storage include any one of: a sensor attribute indicating that the corresponding one of the two or more electronic control units includes a function of sensing information on inside and outside of a vehicle; a brain attribute indicating that the corresponding one of the two or more electronic control units includes a function of processing the information sensed and providing a control instruction; or an actuator attribute indicating that the corresponding one of the two or more electronic control units includes a function of performing control according to the control instruction.

With this, whether the communication is anomalous can be determined from the relationship between the functions of electronic control units; thus, it is possible to improve vehicle safety.

An anomaly detection device according to the third aspect of the present disclosure is the anomaly detection device according to the first aspect of the present disclosure in which each of the attributes stored in the ECU attribute storage indicates the type of information that is handled by the corresponding one of the two or more electronic control units in the in-vehicle network system, and the attributes stored in the ECU attribute storage include any one of: a powertrain attribute indicating handling of control information regarding travel of a vehicle; an infotainment attribute indicating handling of information regarding a notification of a state of the vehicle to an operator; a body attribute indicating handling of control information about a body of the vehicle; an advanced driver-assistance system (ADAS) attribute indicating handling of information regarding an advanced driver assist function that assists or replaces a vehicle operation being performed by the operator; or a connectivity attribute indicating handling of information obtained from outside of the one or more networks.

With this, whether the communication is anomalous can be determined from the relationship between the types of information being handled by electronic control units; thus, it is possible to improve vehicle safety.

An anomaly detection device according to the fourth aspect of the present disclosure is the anomaly detection device according to the first aspect of the present disclosure in which the anomaly detector determines, based on a combination of the attribute of the message source electronic control unit and the attribute of the message destination electronic control unit, whether the message received by the communicator is anomalous.

With this, whether the communication is anomalous can be determined on the basis of the combination of the attributes of electronic control units at the source of the message and the destination of the message; thus, it is possible to improve vehicle safety.

An anomaly detection device according to the fifth aspect of the present disclosure is the anomaly detection device according to the first aspect of the present disclosure in which the anomaly detector determines, based on a relationship between the attribute of the message source electronic control unit or the attribute of the message destination electronic control unit and information included in the message received from the communicator, whether the message received by the communicator is anomalous.

With this, whether the communication is anomalous can be determined even in the case of a falsified message transmission attack; thus, it is possible to improve vehicle safety.

An anomaly detection device according to the sixth aspect of the present disclosure is the anomaly detection device according to the fifth aspect of the present disclosure in which in the in-vehicle network system, messages are transferred by service-oriented communication, and the information included in the message received from the communicator is information stored in a Scalable service-Oriented MiddlewarE over IP (SOME/IP) communication message format.

With this, whether the communication is anomalous can be determined from the relationship between the information stored in the SOME/IP communication message format and the attribute of the electronic control unit; thus, it is possible to improve vehicle safety.

An anomaly detection device according to the seventh aspect of the present disclosure is the anomaly detection device according to the fourth aspect of the present disclosure that further includes: communication log storage in which the message received by the communicator is stored. The anomaly detector: specifies, by referring to the ECU attribute storage and the message stored in the communication log storage, a relationship indicating a combination of the attributes of the message source electronic control unit and the message destination electronic control unit between which the message has been transferred; determines that a newly received message is normal when the newly received message is a message transferred between electronic control units that are included in the two or more electronic control units and include the combination of the attributes indicated in the relationship; and determines that the newly received message is anomalous when the newly received message is a message transferred between electronic control units that are included the two or more electronic control units and include a combination of the attributes different from the combination of the attributes indicated in the relationship.

With this, the definition of anomalous communication using the attributes of the electronic control units can be mechanically generated from the communication log; thus, it is possible to automatically update the definition of anomalous communication.

An anomaly detection device according to the eighth aspect of the present disclosure is the anomaly detection device according to the second or third aspect of the present disclosure in which in the in-vehicle network system, messages are transferred by service-oriented communication, the anomaly detection device further includes: communication log storage in which the message received by the communicator is stored; and an ECU attribute setter that sets the attribute of each of the two or more electronic control units to be stored into the ECU attribute storage, and by referring to the message stored in the communication log storage, the ECU attribute setter determines, from a message type included in the message, whether each of the two or more electronic control units is on a server side or a client side, and determines the attribute of each of the two or more electronic control units according to a ratio between server communication and client communication.

With this, the attribute of the electronic control unit can be defined from the communication log; thus, it is possible to automatically update the attribute of the electronic control unit.

An anomaly detection device according to the ninth aspect of the present disclosure is the anomaly detection device according to the second or third aspect of the present disclosure that further includes: communication log storage in which the message received by the communicator is stored; and an ECU attribute setter that sets, by referring to the message stored in the communication log storage, the attribute of each of the two or more electronic control units stored in the ECU attribute storage. By referring to the ECU attribute storage and the message stored in the communication log storage, the ECU attribute setter determines the attribute of a first electronic control unit according to a frequency of occurrence of the attribute of one of the two or more electronic control units with which the first electronic control unit communicates, the first electronic control unit being one of the two or more electronic control units.

With this, the attribute of the electronic control unit can be defined from the communication log; thus, it is possible to automatically update the attribute of the electronic control unit.

An anomaly detection device according to the tenth aspect of the present disclosure is the anomaly detection device according to the eighth or ninth aspect of the present disclosure in which the ECU attribute setter determines the attribute of each of the two or more electronic control units when one of the following conditions is satisfied: (i) a predetermined time has elapsed since determination of the attribute of the electronic control unit; or (ii) the communicator has received a message that causes a change in a communication tendency of the one or more networks.

This allows for anomaly detection corresponding to the latest state of the in-vehicle network, preventing the problem of false detection increasing with time; thus, it is possible to improve vehicle safety.

An anomaly detection device according to the eleventh aspect of the present disclosure is the anomaly detection device according to the tenth aspect of the present disclosure in which the message that causes the change in the communication tendency of the one or more networks is: a message generated upon obtaining and installing data from a network or a server different from the in-vehicle network system; or a message generated upon changing, deleting, or updating a function setting of the in-vehicle network system.

With this, a change in the in-vehicle network such as obtaining data from an external device and installing the data or changing the function settings of an in-vehicle system can be detected, and the attribute of the electronic control unit can be set again; thus, it is possible to reduce false anomaly detections.

An anomaly detection device according to the twelfth aspect of the present disclosure is the anomaly detection device according to the ninth aspect of the present disclosure in which the anomaly detector calculates, from the message stored in the communication log storage, the frequency of occurrence of the attribute of one of the two or more electronic control units with which the first electronic control unit communicates, and the anomaly detector refers to a frequency of occurrence of the attribute of the first electronic control unit stored in the ECU attribute storage, and when the frequency of occurrence calculated is different by more than a predetermined reference from the frequency of occurrence referred to, determines that communication performed by the first electronic control unit is anomalous.

With this, anomalous communication can be detected in consideration of the tendency of occurrence of the attributes of the entire electronic control units in the in-vehicle network; thus, it is possible to detect an anomaly such as a sharp increase in data traffic from a specific electronic control unit.

An anomaly detection method according to the thirteenth aspect of the present disclosure is an anomaly detection method for detecting an anomaly in an in-vehicle network system including two or more electronic control units and one or more networks. The anomaly detection method includes: transmitting and receiving a message on the one or more networks; and detecting anomalous communication by using an attribute of a message source electronic control unit or an attribute of a message destination electronic control unit among attributes of the two or more electronic control units, the message source electronic control unit being one of the two or more electronic control units that is a source of the message, the message destination electronic control unit being one of the two or more electronic control units that is a destination of the message, each of the attributes being set for a corresponding one of the two or more electronic control units. Each of the attributes indicates a function of a corresponding one of the two or more electronic control units that includes the attribute or a type of information that is handled by the corresponding one of the two or more electronic control units that includes the attribute.

This makes it possible to incorporate an anomaly detection system into more than one device; thus, it is possible to improve vehicle safety.

Hereinafter, anomaly detection devices according to embodiments of the present disclosure will be described with reference to the drawings. Note that each of the embodiments described below shows one specific example of the present disclosure. In other words, the numerical values, shapes, materials, structural elements, the arrangement and connection of the structural elements, steps, the processing order of the steps etc., shown in the following embodiments are mere examples of the present disclosure, and are not intended to limit the present disclosure. The present disclosure is defined based on the recitations of the Claims. Therefore, among the structural elements in the following embodiments, structural elements not recited in any one of the independent claims which indicate the broadest concepts of the present disclosure are not necessarily required to achieve the object of the present disclosure, but are described as structural elements of a more preferred embodiment.

Embodiment 1

The following will describe an anomaly detection method for an in-vehicle network system in which a plurality of ECUs perform service-oriented communication via Ethernet (registered trademark).

1. Overall Configuration of In-Vehicle Network System

FIG. 1 is a diagram illustrating one example of the overall configuration of an in-vehicle network system according to the present embodiment. In FIG. 1, the in-vehicle network system is mounted on vehicle 10 and configured to be able to communicate with OTA server 30 via external network 20.

The in-vehicle network system includes telematics control unit (TCU) 100, central ECU 200, user interface ECU 300, anomaly detection ECU 400, zone ECU 500a, zone ECU 500b, brake control ECU 600a, vehicle speed detection ECU 600b, electric lock control ECU 600c, electric lock open/close ECU 600d, and camera ECU 600e.

Vehicle 10 may include other multiple ECUs not illustrated in FIG. 1.

Central ECU 200 is connected to TCU 100, user interface ECU 300, anomaly detection ECU 400, zone ECU 500a, zone ECU 500b, and camera ECU 600e via Ethernet so as to allow communication therebetween.

Zone ECU 500a is connected to brake control ECU 600a and vehicle speed ECU 600b via controller area network (CAN) 1 so as to allow communication therebetween.

Zone ECU 500b is connected to electric lock control ECU 600c and electric lock open/close ECU 600d via CAN 2 so as to allow communication therebetween.

Note that a network to which zone ECU 500a and zone ECU 500b are connected is not limited to the CAN and may be, for example, other networks such as FlexRay, dedicated communication lines, and wireless communication.

OTA server 30 distributes a system update file for vehicle 10 and includes a platform function for an in-vehicle application.

TCU 100 includes a communication interface for performing communication with external network 20. TCU 100 transmits, to OTA server 30 via external network 20, a frame transmitted from central ECU 200. Furthermore, TCU 100 receives a frame transmitted from OTA server 30 and transmits the frame to central ECU 200.

In central ECU 200, which is an ECU that plays a key role in the in-vehicle network system, various applications operate and achieve various functions of vehicle 10. Central ECU 200 includes a switching function and transfers the received frame to an appropriate ECU via Ethernet.

Furthermore, central ECU 200 transfers the received frame to anomaly detection ECU 400 using the switching function. Moreover, when central ECU 200 receives a frame detection result from anomaly detection ECU 400, central ECU 200 transfers the reported result to user interface ECU 300.

Furthermore, central ECU 200 transmits and receives frames related to the obtainment of an in-vehicle application, an update program, and the like to and from TCU 100.

Furthermore, central ECU 200 can run an application that performs a sophisticated process such as a self-driving operation and communicates with other ECUs via Ethernet or CAN to exchange information required to perform the sophisticated process, control information for performing the sophisticated process, or the like.

User interface ECU 300 provides a user interface for controlling vehicle 10. Specifically, user interface ECU 300 is connected to devices including a controller for controlling steering, a controller for controlling acceleration and deceleration, an input device such as a switch and a touch panel, a USB port, a Wi-Fi module, and the like so as to allow communication therebetween. The user interface ECU accepts a user operation via these devices and reports the content of the user operation to central ECU 200.

Anomaly detection ECU 400, which is connected to central ECU 200 so as to allow communication therebetween, obtains the frame received from central ECU 200 and determines whether the frame is anomalous. Anomaly detection ECU 400 transmits an anomaly detection result to central ECU 200.

Zone ECU 500a transfers the received frame to an appropriate ECU using a switching function. Furthermore, in the case of transferring a CAN frame received via CAN 1 to an appropriate ECU via Ethernet, zone ECU 500a converts the CAN frame into an Ethernet frame. Moreover, in the case of transferring an Ethernet frame received via Ethernet to an appropriate CAN1ECU, zone ECU 500a converts the Ethernet frame into a CAN frame. Zone ECU 500b has substantially the same configuration as zone ECU 500a and thus, description thereof will be omitted. Note that when the network to which zone ECU 500a and zone ECU 500b are connected is any one network among FlexRay, a dedicated communication line, and wireless communication instead of CAN, zone ECU 500a and zone ECU 500b can bi-directionally convert an Ethernet frame and a frame of any one network among FlexRay, a dedicated communication line, and wireless communication as with CAN. In other words, when zone ECU 500a and zone ECU 500b are connected to networks of two different types so as to allow communication therebetween, zone ECU 500a and zone ECU 500b can convert a frame of one of the networks of two different types into a frame of the other.

Brake control ECU 600a controls a brake of vehicle 10.

Vehicle speed detection ECU 600b measures the speed of vehicle 10 using a sensor.

Electric lock control ECU 600c controls opening and closing of an electric lock of vehicle 10.

Electric lock open/close ECU 600d opens and closes the electric lock of vehicle 10.

Camera ECU 600e obtains video captured by a camera of vehicle 10.

2. Configuration of TCU 100

Figures 2, 3:
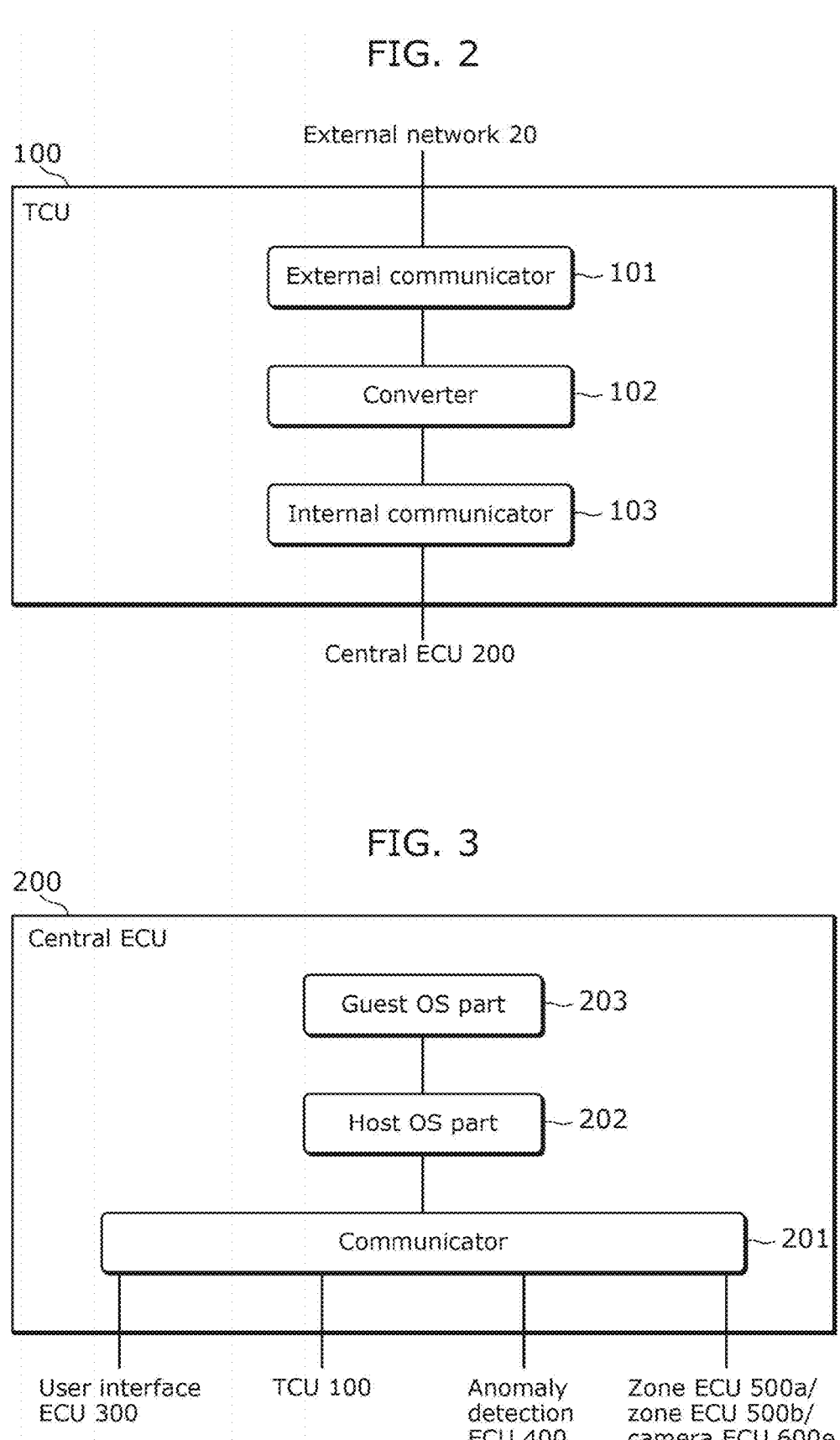
FIG. 2 is a diagram illustrating one example of the configuration of a TCU according to Embodiment 1.
FIG. 3 is a diagram illustrating one example of the configuration of a central ECU according to Embodiment 1.

FIG. 2 is a diagram illustrating one example of the configuration of the TCU according to the present embodiment. In FIG. 2, TCU 100 includes external communicator 101, converter 102, and internal communicator 103.

External communicator 101, which is a communication interface for performing communication with external network 20, performs communication with OTA server 30 via external network 20. External communicator 101 exchanges information with converter 102.

Internal communicator 103, which is a communication interface, communicates with central ECU 200 via Ethernet. Internal communicator 103 reports, to converter 102, a frame received from central ECU 200, receives a frame transmission request from converter 102, and transmits the frame to Ethernet.

Converter 102 converts, into a predetermined format via internal communicator 103 and external communicator 101, data to be transferred of a message received from one of internal communicator 103 and external communicator 101, and transmits the data to the other.

3. Configuration of Central ECU 200

FIG. 3 is a diagram illustrating one example of the configuration of the central ECU according to the present embodiment. In FIG. 3, central ECU 200 includes communicator 201, host OS part 202, and guest OS part 203.

Communicator 201, which is connected to TCU 100, user interface ECU 300, anomaly detection ECU 400, zone ECU 500a, zone ECU 500b, and camera ECU 600e via Ethernet so as to allow communication therebetween, transfers a received frame using a switching function according to the content of the frame.

Furthermore, communicator 201 transfers the received frame to anomaly detection ECU 400 in order to monitor the received frame. Moreover, communicator 201 transmits and receives information to and from host OS part 202.

Host OS part 202 is a main operating system (OS) of central ECU 200. Host OS part 202 exchanges information with communicator 201 and reports the content of communication to guest OS part 203.

Furthermore, host OS part 202 is authorized to change the system settings of guest OS part 203. Host OS part 202 obtains, via communicator 201, operation information indicating the user operation accepted by user interface ECU 300, and transmits a message to TCU 100 so as to download, from OTA server 30 to guest OS part 203, an in-vehicle application indicated in said operation information as an application to be downloaded. Furthermore, host OS part 202 obtains, via communicator 201, operation information indicating the user operation accepted by user interface ECU 300, deletes a guest OS indicated in said operation information as an OS to be deleted, and installs another guest OS. In this manner, host OS part 202 can perform system management.

In order to embody secure host OS part 202, user interface ECU 300 is restricted from changing the functions of host OS part 202 except an OTA system update.

Guest OS part 203 is an OS in which an application of central ECU 200 operates. Guest OS part 203 includes, as one example of the application, the function of obtaining video data from camera ECU 600e via communicator 201, and when vehicle 10 is within a predetermined distance from an object recognized as a person in the video data, requesting brake control ECU 600a to decelerate vehicle 10, for example.

While Embodiment 1 of the present disclosure describes an example in which one guest OS part 203 is provided on host OS part 202, the number of guest OS parts 203 may be two or more. Guest OS part 203 may be virtualization host software or may be virtualization hypervisor software.

4. Configuration of User Interface ECU 300

Figure 4:
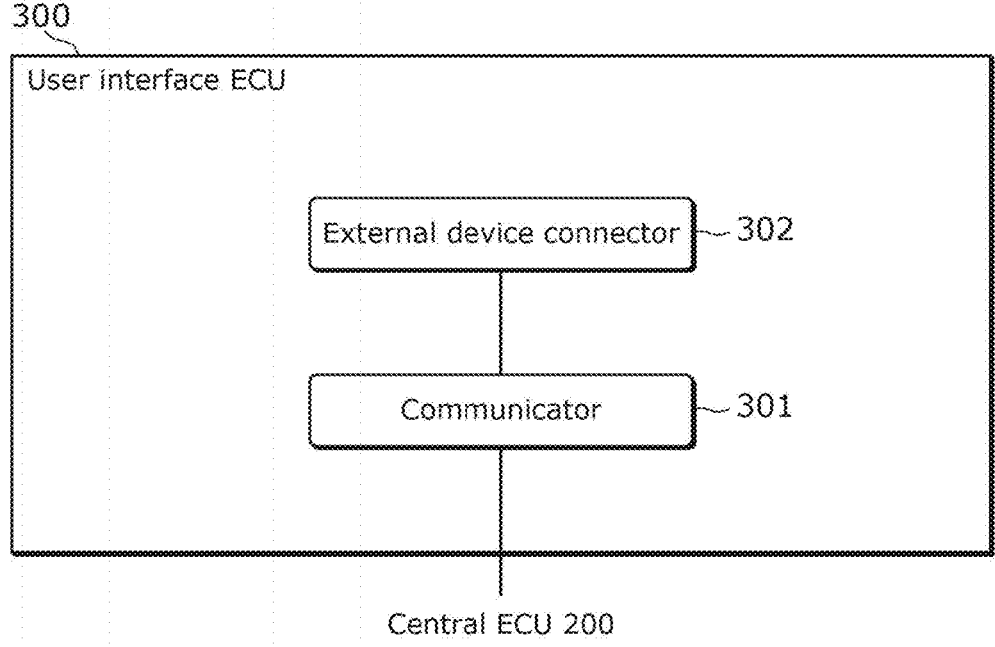
FIG. 4 is a diagram illustrating one example of the configuration of a user interface ECU according to Embodiment 1.

FIG. 4 is a diagram illustrating one example of the configuration of the user interface ECU according to the present embodiment. In FIG. 4, user interface ECU 300 includes communicator 301 and external device connector 302.

Communicator 301, which is connected to central ECU 200 so as to allow communication therebetween, exchanges information with central ECU 200. Communicator 301 plays a role in reporting, to central ECU 200, mainly the information received from external device connector 302.

External device connector 302, which is connected to a device operated by a user or an interface of an external connection device, reports, to communicator 301, the information received from said devices.

The external connection device may be a controller for controlling steering, a controller for controlling acceleration and deceleration, or an input device such as a switch and a touch panel, for example. Furthermore, the external connection device may be a communication interface device such as a USB port, a Wi-Fi module, a diagnostic port, or Bluetooth, for example.

5. Configuration of Anomaly Detection ECU 400

Figure 5:
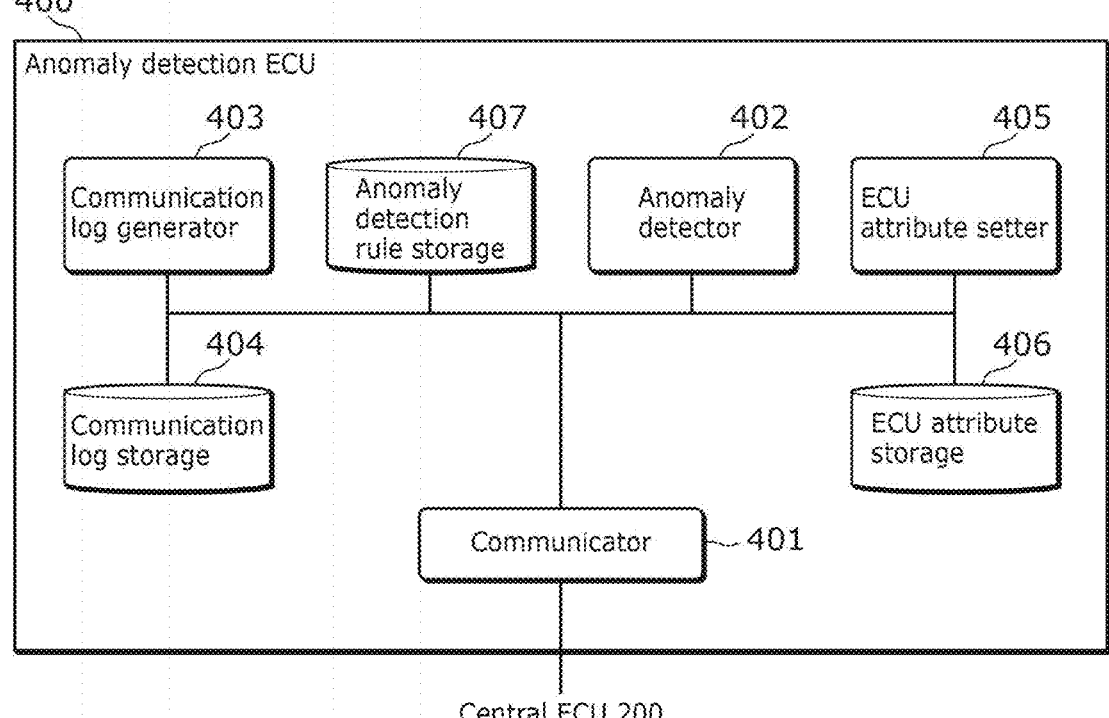
FIG. 5 is a diagram illustrating one example of the configuration of an anomaly detection ECU according to Embodiment 1.

FIG. 5 is a diagram illustrating one example of the configuration of the anomaly detection ECU according to the present embodiment. In FIG. 5, anomaly detection ECU 400 includes communicator 401, anomaly detector 402, communication log generator 403, communication log storage 404, ECU attribute setter 405, ECU attribute storage 406, and anomaly detection rule storage 407.

Communicator 401, which is connected to central ECU 200 so as to allow communication therebetween, exchanges information with central ECU 200. Communicator 401 receives a frame transmitted from central ECU 200, and transfers the received frame to anomaly detector 402 and communication log generator 403.

Furthermore, when the anomaly detection result of the frame is reported from anomaly detector 402, communicator 401 transmits the frame including the anomaly detection result to central ECU 200.

Anomaly detector 402 receives the frame transferred from communicator 401 and when the received frame is a frame compliant with the service-oriented communication protocol, performs anomaly detection on the received frame.

When anomaly detector 402 detects an anomaly, anomaly detector 402 generates a frame including the detection result, and reports said frame to communicator 401 so that said frame is transmitted to central ECU 200.

In the anomaly detection, by referring to ECU attribute storage 406, anomaly detector 402 obtains an ECU attribute corresponding to an IP address (a source IP address or a destination IP address) included in the received frame. Furthermore, in the anomaly detection, anomaly detector 402 obtains, from anomaly detection rule storage 407, an anomaly detection rule to be used for the anomaly detection. An anomaly detection method performed by anomaly detector 402 will be described later.

Furthermore, anomaly detector 402 determines whether the frame transferred from communicator 401 is a frame including information that causes a change in the communication tendency of the in-vehicle network. When the transferred frame is a frame including information that causes a change in the communication tendency of the in-vehicle network, anomaly detector 402 refers to the destination IP address (the source IP address) of the frame and turns ON an attribute setting flag corresponding to the IP address in the ECU attribute storage 406. The frame including information that causes a change in the communication tendency of the in-vehicle network is: a frame generated upon downloading an application onto guest OS part 203; or a frame generated upon transmission of an update file to an ECU, for example. In other words, the frame (message) including information that causes a change in the communication tendency of the in-vehicle network is: a message generated upon obtaining and installing data from a network or a server different from the in-vehicle network; or a message generated upon changing, deleting, or updating the function settings of the in-vehicle system.

Communication log generator 403 receives a frame transferred from communicator 401, extracts a portion of the information included in the received frame, creates a communication log, and adds the created communication log to communication log storage 404. Furthermore, communication log generator 403 includes the function of measuring time in order to add, to the communication log, a timestamp indicating the time of the creation of the communication log.

In communication log storage 404, the communication log transferred from communication log generator 403 is stored. Details of the communication log stored in the communication log storage will be described later.

ECU attribute setter 405 obtains the communication log from communication log storage 404, estimates, for each IP address, what communication tendency is observed and what role attribute the ECU has or what information is being handled and what domain attribute the ECU has, and stores the estimation result into ECU attribute storage 406.

The communication tendency of the ECU may change due to the impact of an OTA system update, the end of an in-vehicle subscription service, a change in the vehicle settings made by an operator, and the like; therefore, what role attribute and what domain attribute the ECU has at what specific timing are verified. The specific timing is, for example, when anomaly detector 402 receives a notification indicating a system shutdown or an arbitrary time at night in the time slot in which a user is not steering vehicle 10. A method for setting the role attribute of the ECU and the domain attribute of the ECU will be described in detail later.

In ECU attribute storage 406, the ECU attribute estimated by ECU attribute setter 405 for each IP address is stored. The ECU attribute represents both the role attribute of the ECU and the domain attribute of the ECU.

The role attribute of the ECU is an attribute indicating the function of the ECU that operates in the in-vehicle network system, from the perspective of the role played by the ECU in vehicle 10. The role attribute of the ECU is classified into three attributes that are: a sensor attribute (sensor) indicating that the ECU includes the function of sensing information on the inside and outside of the vehicle; a brain attribute (brain) indicating that the ECU includes the function of processing the sensed information and providing a control instruction; and an actuator attribute (actuator) indicating that the ECU includes the function of performing control according to the control instruction.

The domain attribute of the ECU is an attribute indicating the type of information that is handled by the ECU in the in-vehicle network system, from the perspective of the role of the data transmitted to the in-vehicle network. The domain attribute of the ECU is classified into five attributes that are: a powertrain attribute (powertrain) indicating handling of control information regarding travel of vehicle 10 such as driving, turning, and stopping; an infotainment attribute (infotainment) indicating handling of information regarding notification about the state of vehicle 10 to a driver (operator); a body attribute (body) indicating handling of control information about the body of vehicle 10; an ADAS attribute (ADAS) indicating handling of information regarding the advanced driver assist function that assists or replaces a vehicle operation being performed by a driver (operator), such as camera images and sensing information; and a connectivity attribute (connectivity) indicating handling of information obtained from the outside of one or more networks included in the in-vehicle network, namely, external network 20. Details of the ECU attribute information will be described later.

In anomaly detection rule storage 407, an anomaly determination rule is stored that is required by anomaly detector 402 to perform the anomaly determination on a frame. Details of the anomaly determination rule stored in anomaly determination rule storage 407 will be described later.

6. Configuration of Zone ECU 500a

Figures 6, 7:
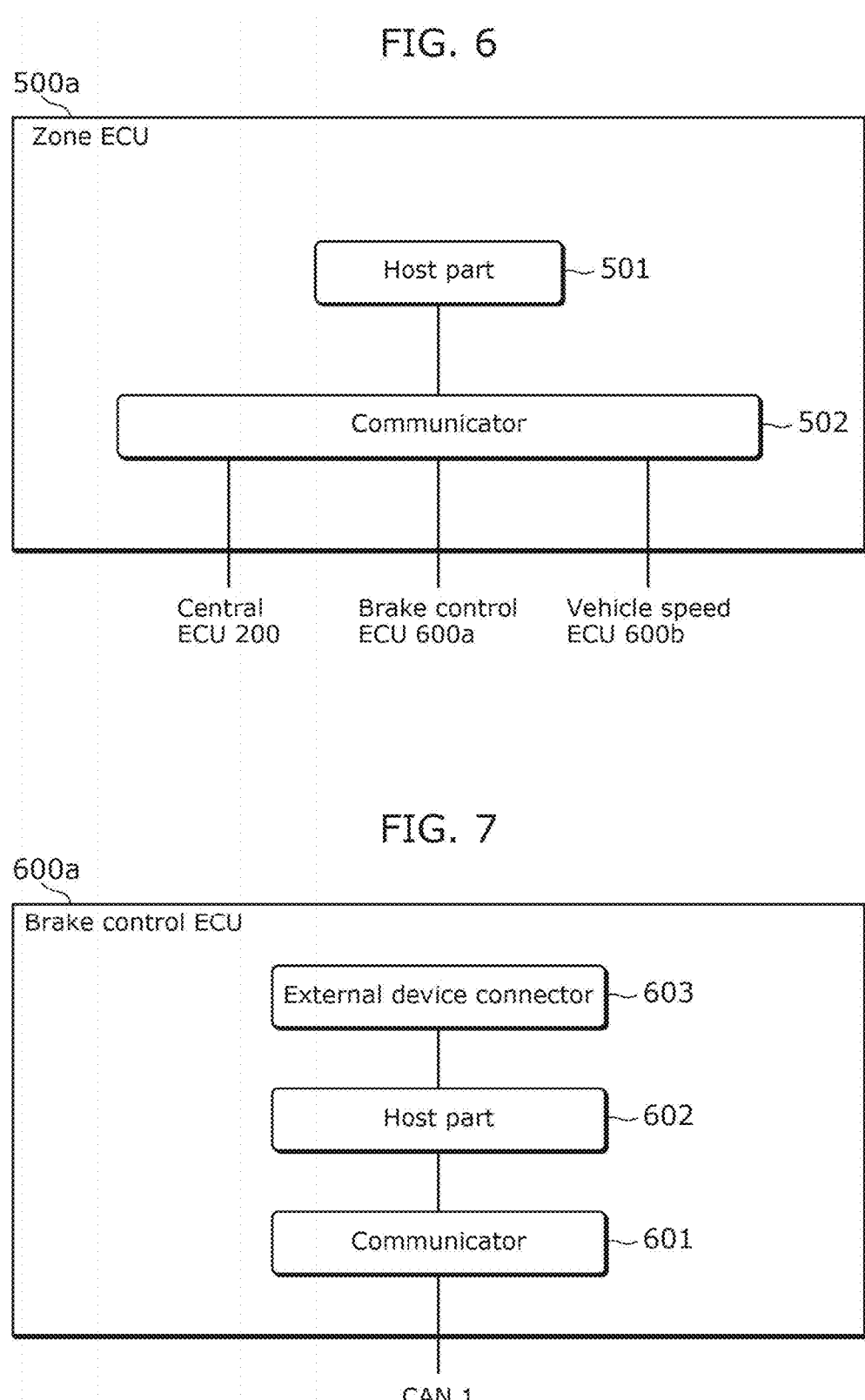
FIG. 6 is a diagram illustrating one example of the configuration of a zone ECU according to Embodiment 1.
FIG. 7 is a diagram illustrating one example of the configuration of a brake control ECU according to Embodiment 1.

FIG. 6 is a diagram illustrating one example of the configuration of the zone ECU according to the present embodiment. Zone ECU 500a includes host part 501 and communicator 502. Zone ECU 500b has substantially the same configuration as zone ECU 500a except that these are connected to different ECUs; thus, description of zone ECU 500b will be omitted.

Host part 501, which is a main portion of zone ECU 500a and is embodied by a central processing unit (CPU) and memory, performs processing according to the communication content received from communicator 502. For example, zone ECU 500a receives a frame reported from camera ECU 600e and vehicle speed detection sensor ECU 600b during reverse parking (moving backward) by a user of vehicle 10. On the basis of video of an area behind vehicle 10 and the speed of vehicle 10 that have been obtained from the received frame, zone ECU 500a transmits a control message to brake control ECU 600a so that contact with an obstacle can be avoided.

Communicator 502 is connected to central ECU 200 via Ethernet so as to allow communication therebetween, and is connected to brake control ECU 600a and vehicle speed detection ECU 600b via CAN 1 so as to allow communication therebetween. Communicator 502 includes a switching function to transfer a received frame according to the content of the frame.

Furthermore, communicator 502 includes the function of converting a CAN frame into an Ethernet frame and converting an Ethernet frame into a CAN frame.

7. Configuration of Brake Control ECU 600a

FIG. 7 is a diagram illustrating one example of the configuration of the brake control ECU according to the present embodiment. Vehicle detection ECU 600b, electric lock control ECU 600c, electric lock open/close ECU 600d, and camera ECU 600e have substantially the same configuration as brake ECU 600a, and thus description thereof will be omitted.

In FIG. 7, brake ECU 600a includes communicator 601, host part 602, and external device connector 603.

Communicator 601, which is a communication interface for performing communication with a network (CAN 1), is connected to CAN 1 so as to allow communication therebetween. Communicator 601 receives a frame flowing through the network, reports the received frame to host part 602, receives a transmission request from host part 602, and transmits the frame to CAN 1.

Host part 602 generates a frame including information obtained from an external connection device such as a sensor or an actuator, and requests communicator 601 to transmit the generated frame. Furthermore, on the basis of the information of the frame reported from communicator 601, host part 602 performs the process of controlling the external connection device.

On the basis of the control information reported from host part 602, external device connector 603 performs an external device control operation or converts the external device control operation into control information and reports the control information to host part 602.

8. SOME/IP Message Format

SOME/IP defines four different communication methods, namely, Request/Response, Fire/Forget, Events, and Get/ Set/Notifier; the service-oriented communication is realized by combining these methods. SOME/IP prepares a method for establishing a session with a communication counterpart; this method is referred to as service discovery (SD).

FIG. 8 is a diagram illustrating one example of a SOME/ IP SD message format according to the present embodiment. The message format is stored in the payload portion of Ethernet.

In FIG. 8, the message format includes a SOME/IP header and SOME/IP SD, and one row of the message format is 32-bit long.

The SOME/IP header includes Message ID, Length, Request ID, Protocol Version, Interface Version, Message Type, and Return Code.

Message ID is 0xFFFF8100.

In Length, the number of bytes of data following the Length field is stored.

In Request ID, the numerical value of Client ID and Session ID combined is stored.

Protocol Version is 0x01, Interface Version is 0x01, Message type is 0x02, and Return Code is 0x00.

SOME/IP SD includes Flags, Reserved, Length of Entries Array in Bytes, Entries Array, Length of Options Array in Bytes, and Options Array. In Length of Entries Array in Bytes, the number of bytes of Entry Array is stored. In Length of Options Array in Bytes, the number of bytes of Options Array is stored.

FIG. 9 is a diagram illustrating one example of a SOME/ IP SD message according to the present embodiment.

Entry Array includes Index 1st Options, Index 2nd options, #of op1, #of op2, Service ID, Instance ID, Major Version, and TTL, and Minor Version.

Options Array includes Length, Type, Reserved, IPv4 address, Reserved, L4-Proto, and Port Number.

In FIG. 9, SOME/IP SD is a message in which Service ID is 0x1000, meaning that a service with Service ID 0x1000 can be provided.

Flags is set to 0x80; 0x80 represents Reboot Flag. The Reserved field is set to 0.

In Length of Entries Array in Bytes, 16 bytes are set.

In Type, 0x00 or 0x01 can be set; 0x00 indicates Find, and 0x01 indicates Offer. Find is used by a client ECU, which receives a service provided thereto, to request provision of a necessary service, and Offer is used by a server ECU, which provides a service, to report a service that can be provided by the server ECU itself. In FIG. 9, 0x01 is set in Type.

Index 1st options, which indicates the position of the first option, is set to zero in FIG. 9, indicating that this is the start of the option field.

Index 2nd options, which is the position of the second option, is set to zero in FIG. 9.

of opt1, which is a field indicating the number of options 1, is set to 1 in FIG. 9.

of opt2, which is a field indicating the number of options 2, is set to 0 in FIG. 9, indicating that option 2 is not used.

Service ID, which is a field indicating ID indicating the type of a service, is set to 0x1000 in FIG. 9.

Instance ID, which is ID indicating an instance of a service, indicates in FIG. 9 that this is the instance identified by 0x0001.

Major Version, which is used for the management of the version of a service, is set to 0x01 in FIG. 9.

TTL, which is a field for setting a valid period (seconds) of a service, is set to 0xFFFF in FIG. 9. 0xFFFF indicates that the service is valid until the next start of the ECU.

Minor Version, which is used for the management of the version of a service, is set to 0x00000002 in FIG. 9.

Next, in the Option field, first, Length of Options Array in Byte is set to the length of the Option field, which is 12 bytes in FIG. 9.

The set value of Length depends on the type of the option. In FIG. 9, which illustrates an example of communication using IPv4, Length is set to 9, Type is set to 0x04, and Reserved is set to 0x00.

IPv4 Address, which is the IP address of a server, is set to 192.168.0.1 in FIG. 9.

The Reserved field is set to 0. L4-Proto is set to 0x11, and 0x11 indicates the use of the User Datagram Protocol (UDP).

At the end, the port number is set; FIG. 9 shows that the port has port number 35000.

9. One Example of Communication Log stored in Communication Log Storage

FIG. 10 is a diagram illustrating one example of the communication log stored in the communication log storage. In FIG. 10, the communication log includes a timestamp, a source IP address, a destination IP address, a source port, a destination port, a transport protocol, service ID, method ID, a message type, and a message size. Each row in FIG. 10 represents one SOME/IP message transferred from communicator 401 to communication log generator 403.

The timestamp included in the communication log is time obtained by communication log generator 403 at the time of communication log generation. Information included in the communication log other than the timestamp is a portion of the information extracted from the Ethernet frame received by communication log generator 403.

The source IP address is extracted from the source IP address field included in an Ethernet frame. The destination IP address is extracted from the destination IP address field included in the Ethernet frame. The source port is extracted from the source port included in the Ethernet frame. The destination port is extracted from the destination port included in the Ethernet frame. The transport protocol is extracted from the protocol included in the Ethernet frame. The service ID is extracted from the Service ID in the SOME/IP message format included in the Ethernet frame. The method ID is extracted from the Method ID in the SOME/IP message format included in the Ethernet frame. The message type is extracted from the Message Type in the SOME/IP message format included in the Ethernet frame. The message size is extracted from the Length in the SOME/IP message format included in the Ethernet frame.

10. One Example of ECU Attribute Information Stored in ECU Attribute Storage FIG. 11 is one example of the ECU attribute information stored in the ECU attribute storage. In FIG. 11, the ECU attribute information includes an IP address, an ECU attribute, an attribute setting flag, flag-OFF setting date and time, and flag-ON setting date and time. Furthermore, the ECU attribute includes two items that are the role attribute of the ECU and the domain attribute of the ECU. The role attribute of the ECU includes three attributes that are sensor, brain, and actuator, and the domain attribute of the ECU includes five attributes that are connectivity, powertrain, ADAS, body, and infotainment.

The IP address is a source IP address included in a frame received by anomaly detector 402. When anomaly detector 402 receives a frame including an IP address not recorded in ECU attribute storage 406, anomaly detector 402 adds a new IP address row to the ECU attribute information. At this time, in the added row, as initial values, zero is recoded for every item of the ECU attribute and the flag-OFF setting date and time, ON is recorded for the attribute setting flag, and the timestamp included in the received frame is recorded for the flag-ON setting date and time.

ECU attribute setter 405 sets the ECU attribute. A method for setting the ECU attribute by ECU attribute setter 405 will be described later. At the time of detecting an anomaly, anomaly detector 402 uses the ECU attribute to refer to what attribute the ECU has.

The attribute setting flag is a flag used by ECU attribute setter 405 to determine whether the ECU attribute is to be reset. The attribute setting flag being ON means that ECU attribute setter 405 will reset the ECU attribute on the next occasion, and the attribute setting flag being OFF means that ECU attribute setter 405 will not reset the ECU attribute on the next occasion.

At the time when the process of setting the ECU attribute is completed, ECU attribute setter 405 sets the attribute setting flag to OFF. When ECU attribute setter 405 detects that a predetermined time has elapsed since the flag-OFF setting date and time, ECU attribute setter 405 sets the attribute setting flag to ON. Alternatively, when anomaly detector 402 detects a frame including information that causes a change in the communication tendency of the ECU, ECU attribute setter 405 sets the attribute setting flag to ON.

The flag-OFF setting date and time is UNIX (registered trademark) time at which ECU attribute setter 405 sets the attribute setting flag to OFF. When there is a value already recorded as the flag-OFF setting date and time, the greater UNIX time is set. This value is referred to by ECU attribute setter 405 at a specific timing and is used to determine whether a predetermined time has elapsed since the recorded UNIX time.

The flag-ON setting date and time is UNIX time at which ECU attribute setter 405 sets the attribute setting flag to ON. When there is a value already recorded as the flag-ON setting date and time, the greater UNIX time is set. This value is referred to by ECU attribute setter 405 at the timing of setting the attribute of the ECU and is used to obtain, from communication log storage 404, a communication log required to set the attribute.

11. Anomaly Detection Rule Based on ECU Attribute

FIG. 12 is a diagram illustrating one example of an anomaly detection rule using the ECU attribute that is stored in the anomaly detection rule storage. In FIG. 12, the anomaly detection rule is used to determine whether communication of a target frame is normal or anomalous. The anomaly detection rule indicates whether the combination of the ECU attribute of the source ECU and the ECU attribute of the destination ECU is permitted (OK) or not permitted (NG). According to the anomaly detection rule, the communication between the source ECU and the destination ECU the combination of which is indicated as OK is normal, and the communication between the source ECU and the destination ECU the combination of which is indicated as NG is anomalous. With the anomaly detection rule, when there is communication between ECUs the combination of which is OK, said communication is determined as normal, and when there is communication between ECUs the combination of which is NG, said communication is determined as anomalous.

In FIG. 12, for example, when the domain attribute of the source ECU is connectivity and the domain attribute of the destination ECU is connectivity, the target frame is determined as normal in the case of the combination of sensor as the role attribute of the source ECU and brain as the role attribute of the destination ECU, the combinations of brain as the role attribute of the source ECU and sensor, brain, and actuator as the role attribute of the destination ECU, and the combination of actuator as the role attribute of the source ECU and brain as the role attribute of the destination ECU.

Furthermore, in FIG. 12, when the domain attribute of the destination ECU is body and the role attribute of the destination ECU is actuator, the target frame is determined as normal in the case of the combination of ADAS as the domain attribute of the source ECU and brain as the role attribute of the source ECU and the combination of body as the domain attribute of the source ECU and brain as the role attribute of the source ECU. This is because the case where an ECU having a domain attribute of body such as opening/closing of an electric lock and airbag deployment and a role attribute of actuator receives a control command includes the case where an ECU that detects a car key operation and controls an electric lock transmits a control command and the case where an ECU that controls a self-driving operation detects the danger of an operator and transmits a control command to deploy an airbag.

Furthermore, in FIG. 12, a frame having a combination of connectivity as the domain attribute of the source ECU and powertrain as the domain attribute of the destination ECU is defined as anomalous communication. This is because if a connectivity ECU which handles information regarding communication with an external device performs communication with a powertrain ECU which handles control information regarding travel of a vehicle, there is a risk that the vehicle may be remotely controlled.

12. Sequence about ECU Attribute Change

Figure 13:
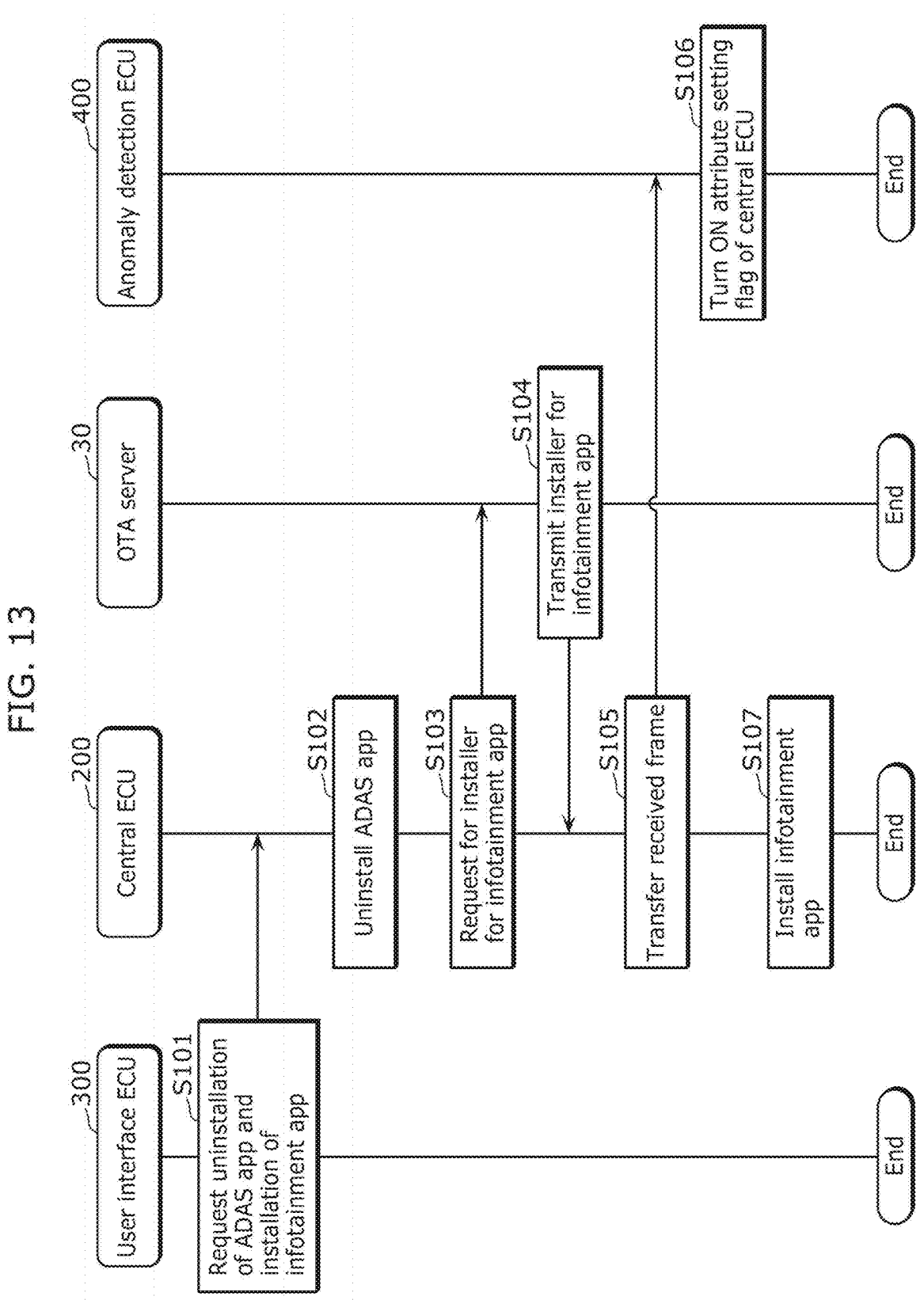
FIG. 13 is a diagram illustrating one example of an ECU attribute change sequence according to Embodiment 1.

FIG. 13 is a diagram illustrating one example of an ECU attribute change sequence according to the present embodiment. In FIG. 13, in the case where a user of vehicle 10 operates the touch panel of user interface ECU 300, uninstalls an application regarding ADAS installed on guest OS part 203 of central ECU 200, and installs an application regarding infotainment, anomaly detection ECU 400 detects a change in the in-vehicle network and resets the ECU attribute information to be used for the anomaly detection.

(S101) User interface ECU 300 accepts a user operation and requests guest OS part 203 of central ECU 200 to uninstall an application regarding ADAS installed thereon and install an application regarding infotainment.

(S102) Central ECU 200 uninstalls the application regarding ADAS (ADAS app) on guest OS part 203.

(S103) Central ECU 200 requests OTA server 30 to transmit an installer for the application regarding infotainment (infotainment app) to guest OS part 203.

(S104) OTA server 30 transmits, to guest OS part 203 of central ECU 200, a frame including the installer.

(S105) Central ECU 200 transfers, to anomaly detection ECU 400, the frame received in Step S104.

(S106) Anomaly detector 402 of anomaly detection ECU 400 extracts the IP address of the central ECU stored in the frame transferred thereto. Furthermore, anomaly detector 402 refers to the IP addresses stored in ECU attribute storage 406 and when the extracted IP address is included in said IP addresses, sets an attribute setting flag corresponding to the IP address to ON.

(S107) Central ECU 200 installs the infotainment application using the received installer.

Figure 14:
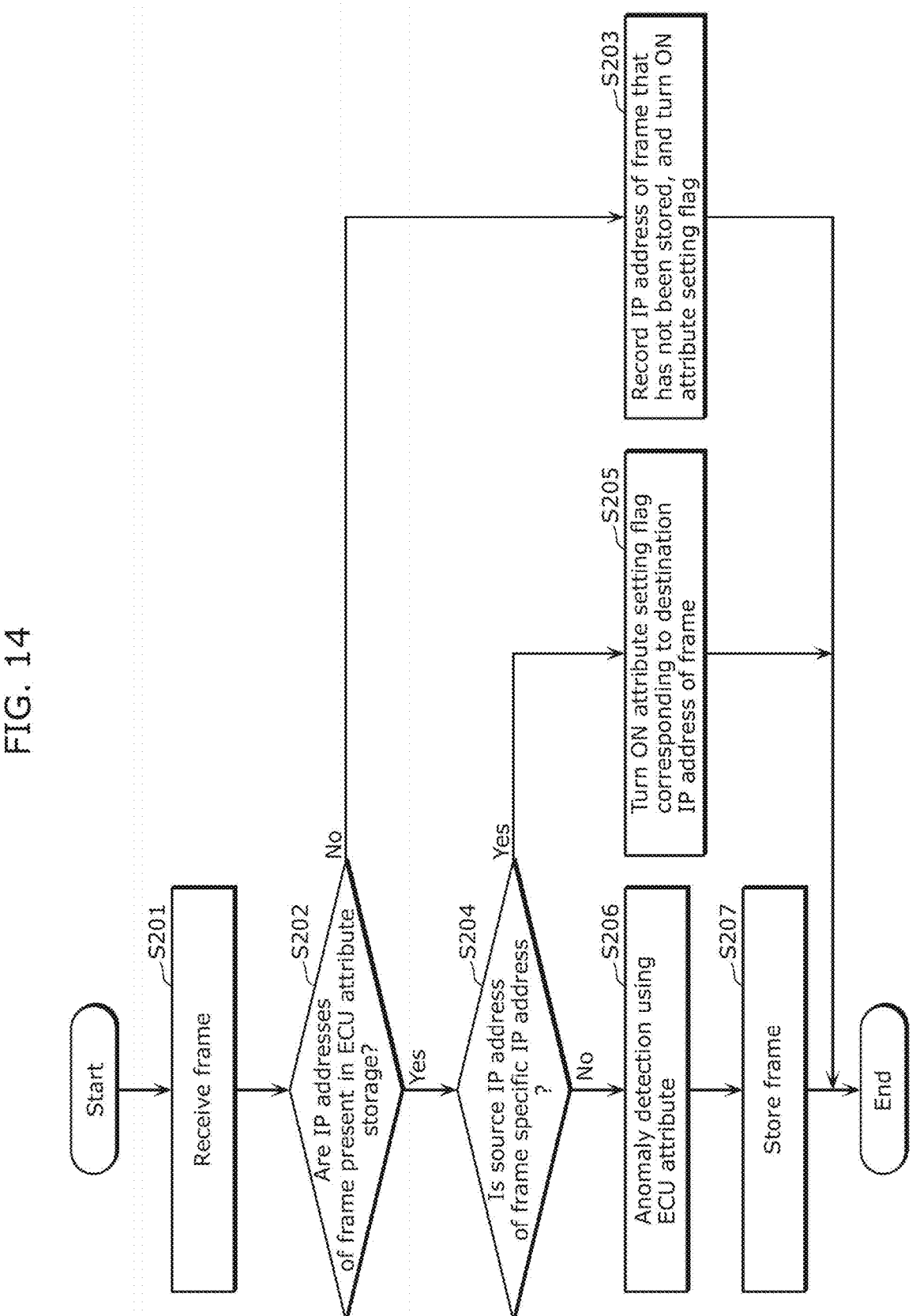
FIG. 14 is a diagram illustrating one example of a flowchart regarding an operation of an anomaly detection ECU upon frame reception in Embodiment 1.

13. Flowchart Regarding Operation of Anomaly Detection ECU 400 Upon Frame Reception FIG. 14 is a diagram illustrating one example of a flowchart regarding an operation of anomaly detection ECU 400 upon frame reception in the present embodiment.

(S201) Communicator 401 receives a frame transferred from central ECU 200.

(S202) ECU attribute setter 405 determines whether the source IP address and the destination IP address stored in the frame received in Step S201 have been stored in ECU attribute storage 406. When at least one of the source IP address and the destination IP address has not been stored in ECU attribute storage 406 (No in S202), ECU attribute setter 405 performs the process in Step S203. When both of the source IP address and the destination IP address have been stored in ECU attribute storage 406 (Yes in S202), ECU attribute setter 405 performs the process in Step S204.

(S203) ECU attribute setter 405 newly stores, into ECU attribute storage 406, an IP address not stored in ECU attribute storage 406 out of the source IP address and the destination IP address of the received frame, and turns ON the attribute setting flag. Furthermore, ECU attribute setter 405 obtains a date and time in UNIX time and stores the obtained UNIX time into ECU attribute storage 406 as the time of the turn-on of the attribute setting flag.

(S204) ECU attribute setter 405 determines whether the source IP address of the received frame is a specific IP address. When the source IP address of the received frame is the specific IP address (Yes in S204), ECU attribute setter 405 performs the process in Step S205, and when the source IP address of the received frame is not the specific IP address (No in S204), ECU attribute setter 405 performs the process in Step S206. The frame transmitted from the specific IP address is a frame including information that causes a change in the communication tendency of the in-vehicle network and is specifically: a frame generated upon downloading an application onto guest OS part 203; or a frame generated upon transmission of an update file to the ECU, for example.

(S205) ECU attribute setter 405 turns ON the attribute setting flag for the IP address in ECU attribute storage 406 that corresponds to the destination IP address of the received frame. Furthermore, ECU attribute setter 405 obtains a date and time in UNIX time and stores the obtained UNIX time into ECU attribute storage 406 as the time of the turn-on of the attribute setting flag.

(S206) Using the ECU attribute, anomaly detector 402 determines whether the received frame is anomalous.

Details of an anomaly detection process in which the ECU attribute is used will be described later.

(S207) Anomaly detector 402 stores the received frame into communication log storage 404.

14. Flowchart of ECU Attribute Setting Process

Figure 15:
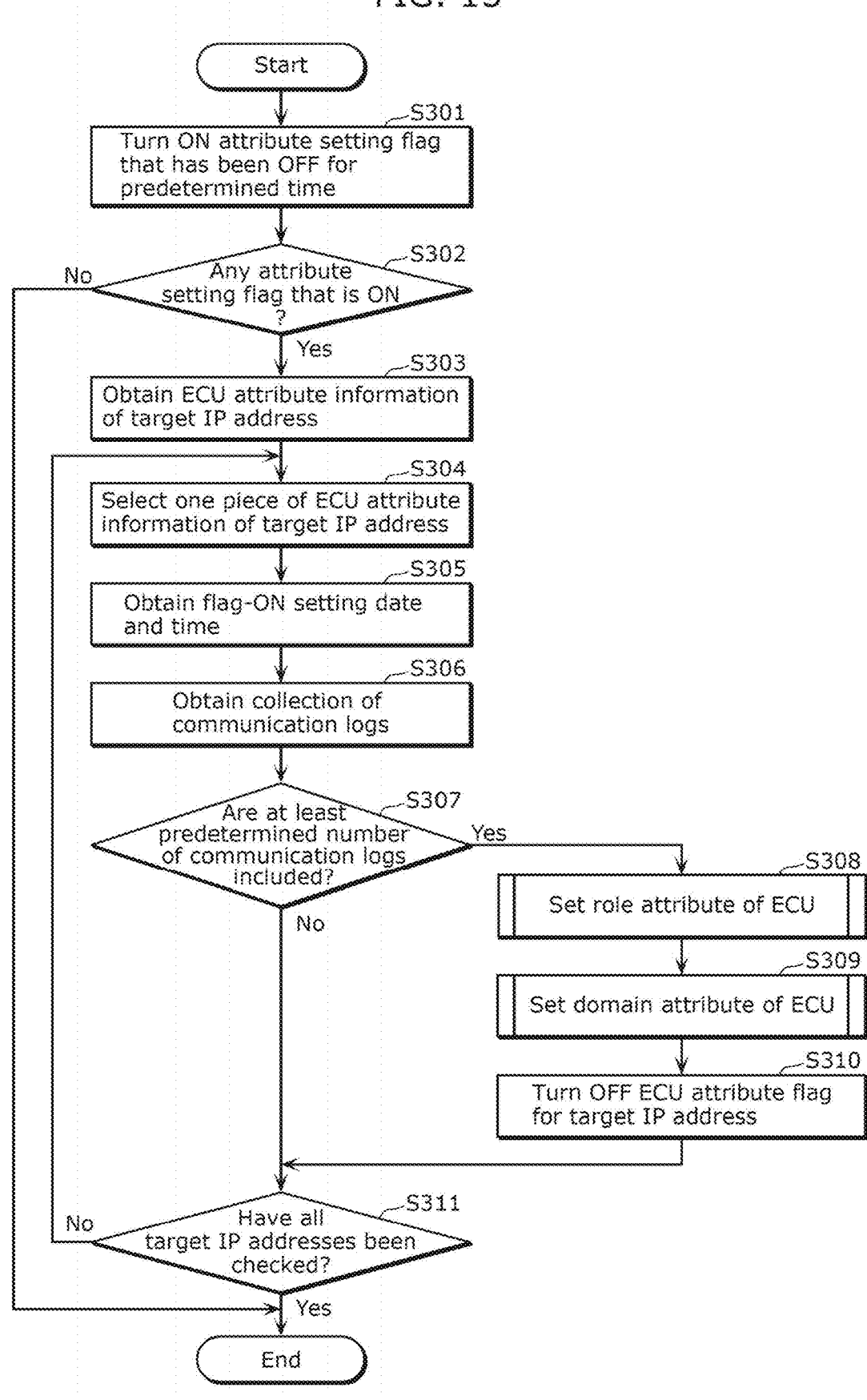
FIG. 15 is a diagram illustrating one example of a flowchart regarding ECU attribute setting in Embodiment 1.

FIG. 15 illustrates one example of a flowchart regarding ECU attribute setting in the present embodiment. ECU attribute setter 405 sets an attribute for each IP address of the ECU. The ECU attribute setting process is performed at a specific timing such as the time of shutdown of a vehicle system or an arbitrary time at night in which no steering control is performed, and by updating the ECU attribute information to be used for the anomaly detection process, makes it possible to distinguish between anomalous communication performed by an attacker and normal communication generated according to a change in the communication tendency of the in-vehicle network.

(S301) ECU attribute setter 405 obtains a start date and time in UNIX time at the start of the processing. ECU attribute setter 405 refers to the flag-OFF setting date and time for an IP address for which the attribute setting flag has been set to OFF out of the IP addresses stored in ECU attribute storage 406, and calculates a difference between the recorded UNIX time and the start date and time. When the calculated difference is greater than or equal to a predetermined time (in other words, when at least a predetermined time has elapsed), ECU attribute setter 405 sets the attribute setting flag for the target IP address to ON, obtains a date and time in UNIX time, and stores the obtained date and time into ECU attribute storage 406 as the flag-ON setting date and time.

(S302) ECU attribute setter 405 determines whether the IP addresses stored in ECU attribute storage 406 include an IP address for which the attribute setting flag is ON. When there is an IP address for which the attribute setting flag is ON (Yes in S302), ECU attribute setter 405 performs the process in Step S303. When there is no IP address for which the attribute setting flag is ON (No in S302), ECU attribute setter 405 ends the ECU attribute setting process.

(S303) ECU attribute setter 405 obtains the ECU attribute information of the IP address for which the attribute setting flag is ON in ECU attribute storage 406.

(S304) ECU attribute setter 405 sequentially selects one IP address from the obtained ECU attribute information of the IP addresses.

(S305) ECU attribute setter 405 obtains the flag-ON setting date and time for the selected IP address.

(S306) ECU attribute setter 405 obtains a collection of communication logs involving the selected IP address from communication log storage 404. The collection of communication logs is a collection of communication logs that are stored in communication log storage 404 and in each of which the selected IP address is included as the source IP address or the destination IP address and the recorded timestamp is later than the flag-ON setting date and time for the selected IP address.

(S307) ECU attribute setter 405 determines whether the obtained collection of communication logs include at least a predetermined number of communication logs. When the obtained collection of communication logs include at least the predetermined number of communication logs (Yes in S307), ECU attribute setter 405 performs the process in Step S308. When the obtained collection of communication logs fails to include at least the predetermined number of communication logs (No in S307), ECU attribute setter 405 performs the process in Step S311.

(S308) ECU attribute setter 405 sets the role attribute of the ECU using the selected IP address and the obtained collection of communication logs. Details thereof will be described later.

(S309) ECU attribute setter 405 sets the domain attribute of the ECU using the selected IP address and the obtained collection of communication logs. Details thereof will be described later.

(S310) ECU attribute setter 405 turns OFF the attribute setting flag for the selected IP address in ECU attribute storage 406. ECU attribute setter 405 obtains a date and time in UNIX time and stores the obtained date and time as the flag-OFF setting date and time which is the time of the turn-off of the attribute setting flag.

(S311) ECU attribute setter 405 determines whether the entire target ECU attribute information has been selected. When the entire target ECU attribute information has been selected (Yes in S311), ECU attribute setter 405 ends the processing. When some of the entire target ECU attribute information has not been selected (No in S311), ECU attribute setter 405 performs the process in Step S304.

15. Flowchart of ECU Role Attribute Setting

Figure 16:
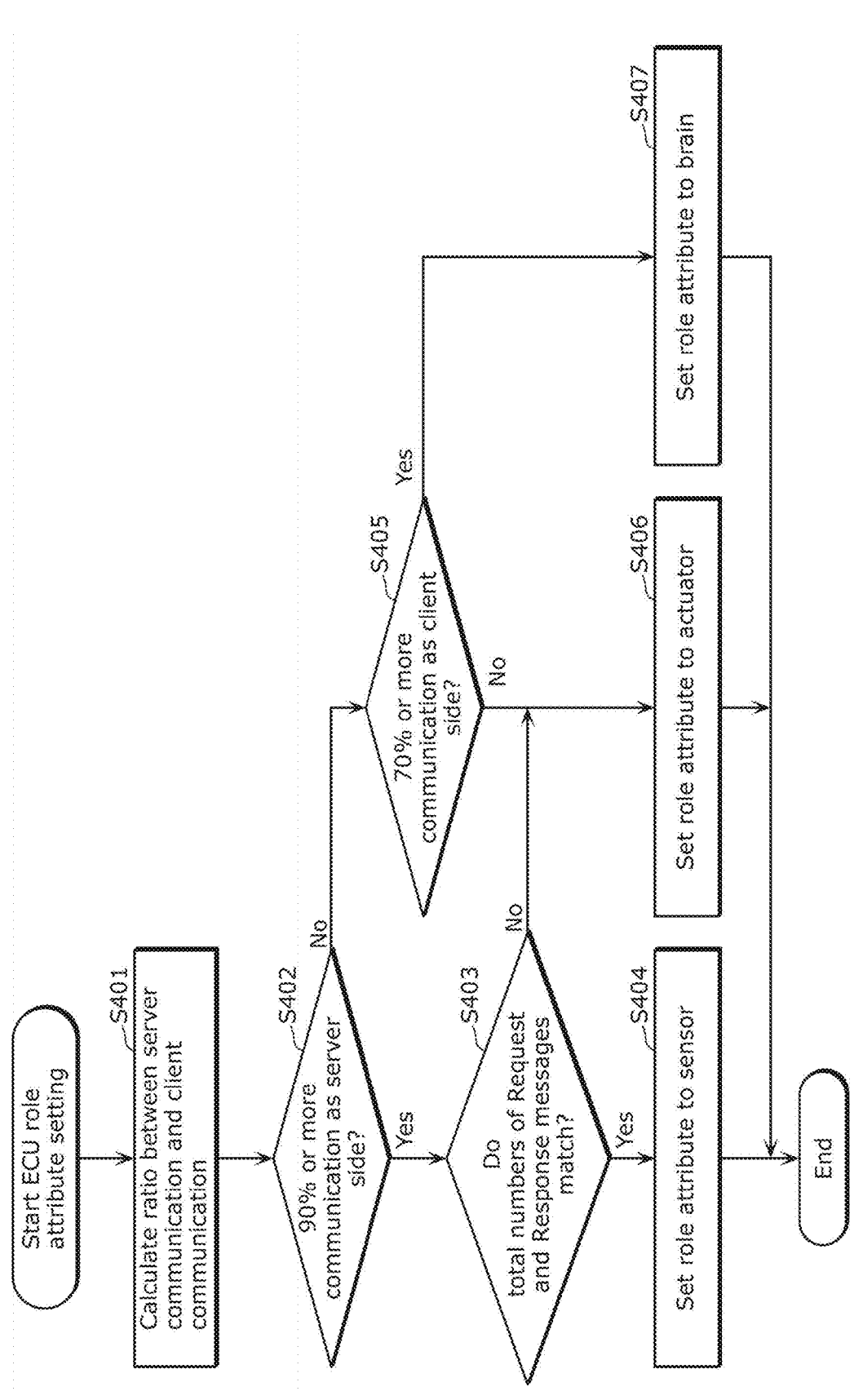
FIG. 16 is a diagram illustrating one example of a flowchart regarding ECU role attribute setting in Embodiment 1.

FIG. 16 illustrates one example of a flowchart regarding the ECU role attribute setting by ECU attribute setter 405 in the present embodiment.

(S401) In the obtained collection of communication logs, ECU attribute setter 405 checks whether the selected IP address is included in the source IP address or included in the destination IP address and what the message type is. When the message type is Notification, ECU attribute setter 405 determines that the source IP address is on the server side and the destination IP address is on the client side, when the message type is Request, ECU attribute setter 405 determines that the source IP address is on the client side and the destination IP address is on the server side, and when the message type is Response, ECU attribute setter 405 determines that the source IP address is on the server side and the destination IP address is on the client side.

Subsequently, ECU attribute setter 405 calculates a ratio between the communication log of the selected IP address as the server side and the communication log of the selected IP address as the client side in the obtained collection of communication logs, and further counts the number of times a message of message type Request has been received at the selected IP address and the number of times a message of message type Response has been transmitted from the selected IP address.

(S402) ECU attribute setter 405 determines whether the communication logs as the server side account for 90% or more of the obtained collection of communication logs. When the communication logs as the server side account for 90% or more (Yes in S402), ECU attribute setter 405 performs the process in Step S403. When the communication logs as the server side does not account for 90% or more (No in S402), ECU attribute setter 405 performs the process in Step S405.

(S403) ECU attribute setter 405 determines whether there is a match between the number of times the Request message has been received at the selected IP address and the number of times the Response message has been transmitted from the selected IP address in the obtained collection of communication logs. When there is a match between the number of times the Request message has been received and the number of times the Response message has been transmitted (Yes in S403), ECU attribute setter 405 performs the process in Step S404. When there is no match between the number of times the Request message has been received and the number of times the Response message has been transmitted (No in S403), ECU attribute setter 405 performs the process in Step S406.

(S404) ECU attribute setter 405 determines that the ECU at the selected IP address has the role of a sensor, and sets the sensor in the ECU role attribute at the selected IP address in ECU attribute storage 406 to 1.

(S405) ECU attribute setter 405 determines whether the communication logs as the client side account for 70% or more of the obtained collection of communication logs. When the communication logs as the client side account for 70% or more (Yes in S405), ECU attribute setter 405 performs the process in Step S407. When the communication logs as the client side does not account for 70% or more (No in S405), ECU attribute setter 405 performs the process in Step S406.

(S406) ECU attribute setter 405 determines that the ECU at the selected IP address has the role of an actuator, and sets the actuator in the ECU role attribute at the selected IP address in ECU attribute storage 406 to 1.

(S407) ECU attribute setter 405 determines that the ECU at the selected IP address has the role of a brain, and sets the brain in the ECU role attribute at the selected IP address in ECU attribute storage 406 to 1.

Note that whether the communication logs as the server side account for 90% or more of the obtained collection of communication logs is determined in the process in Step S402, and whether the communication logs as the client side account for 70% or more of the obtained collection of communication logs is determined in the process in Step S405, but the percentages used as threshold values in Step S402 and Step S405 are not limited to 90% and 70%, respectively. These percentages as the threshold values may be properly adjusted according to the communication tendency of the vehicle type.

16. Flowchart of ECU Domain Attribute Setting

Figure 17:
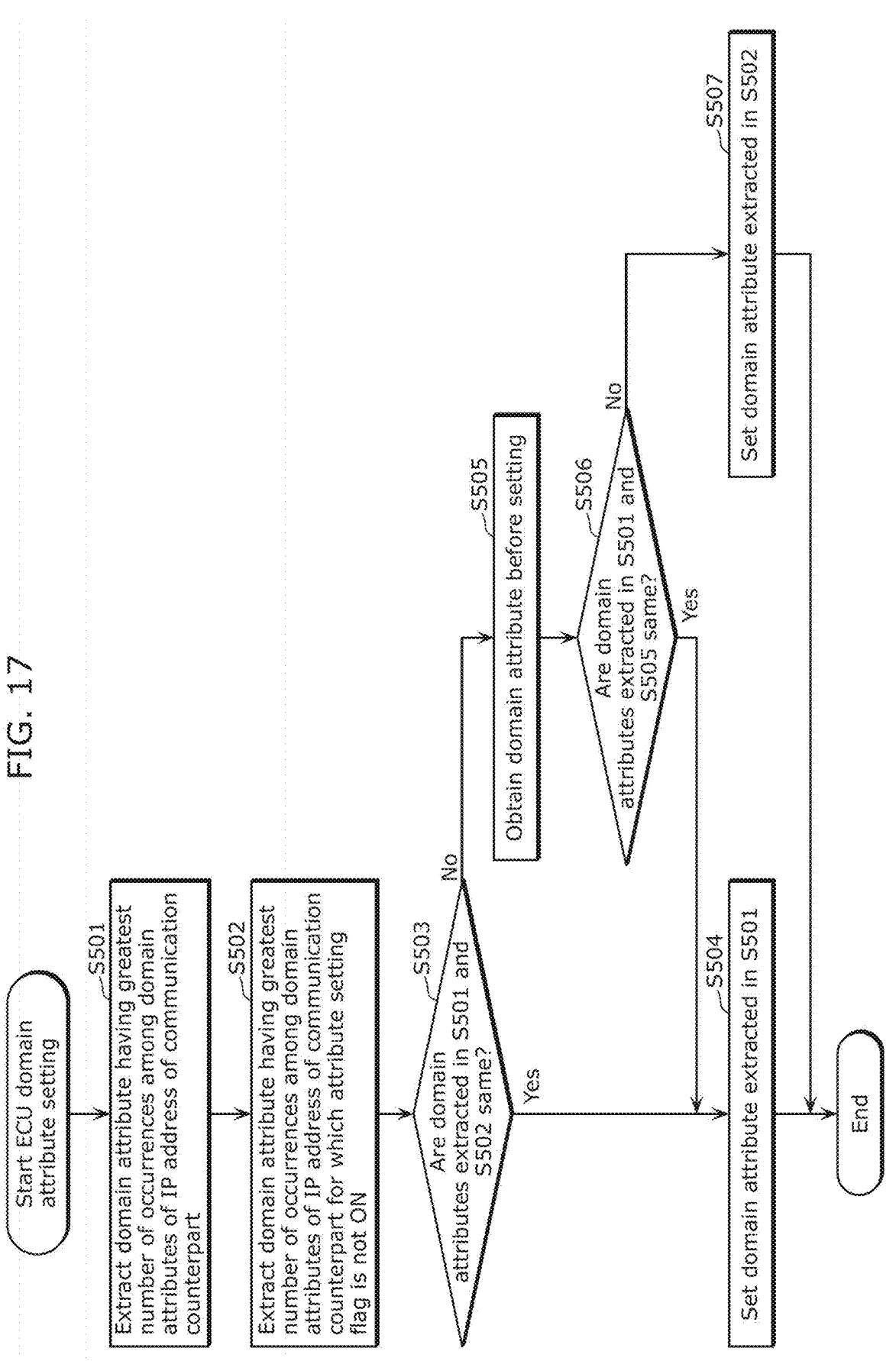
FIG. 17 is a diagram illustrating one example of a flowchart regarding ECU domain attribute setting in Embodiment 1.

FIG. 17 illustrates one example of a flowchart regarding the ECU domain attribute setting by the ECU attribute setter in the present embodiment.

(S501) In the obtained collection of communication logs, ECU attribute setter 405 obtains, from ECU attribute storage 406, the domain attribute of the IP address of a communication counterpart for the selected IP address, counts the number of occurrences of each domain attribute, specifically, each of five domain attributes that are connectivity, powertrain, ADAS, body, and infotainment, and extracts a domain attribute having the greatest number of occurrences.

(S502) ECU attribute setter 405 excludes, from the obtained collection of communication logs, a communication log in which the attribute setting flag for the IP address of a communication counterpart for the selected IP address is ON, and as in Step S501, counts the number of occurrences of each domain attribute, and extracts a domain attribute having the greatest number of occurrences. Note that the IP address of a communication counterpart for the selected IP address is a destination IP address paired with a source IP address when the ECU at the selected IP address is the source IP address, and is a source IP address paired with a destination IP address when the ECU at the selected IP address is the destination IP address.

(S503) ECU attribute setter 405 determines whether the domain attribute extracted in Step S501 and the domain attribute extracted in Step S502 are the same. When these are the same (Yes in S503), ECU attribute setter 405 performs the process in Step S504. When these are not the same (No in S503), ECU attribute setter 405 performs the process in Step S505.

(S504) ECU attribute setter 405 regards, as the domain attribute of the selected IP address, the domain attribute extracted in Step S501, and sets, to 1, the domain attribute extracted in Step S501 among the ECU domain attributes of the selected IP address in ECU attribute storage 406.

(S505) ECU attribute setter 405 obtains the domain attribute of the selected IP address by referring to ECU attribute storage 406.

(S506) ECU attribute setter 405 determines whether the domain attribute extracted in Step S501 and the domain attribute obtained in Step S505 are the same. When the domain attribute extracted in Step S501 and the domain attribute obtained in Step S505 are the same (Yes in S506), ECU attribute setter 405 performs Step S504. When the domain attribute extracted in Step S501 and the domain attribute obtained in Step S505 are not the same (No in S506), ECU attribute setter 405 performs Step S507.

(S507) ECU attribute setter 405 regards, as the domain attribute of the selected IP address, the domain attribute extracted in Step S502, and sets, to 1, the domain attribute extracted in Step S502 among the ECU domain attributes of the selected IP address in ECU attribute storage 406.

17. Anomaly Detection Sequence Using ECU Attributes

Figure 18:
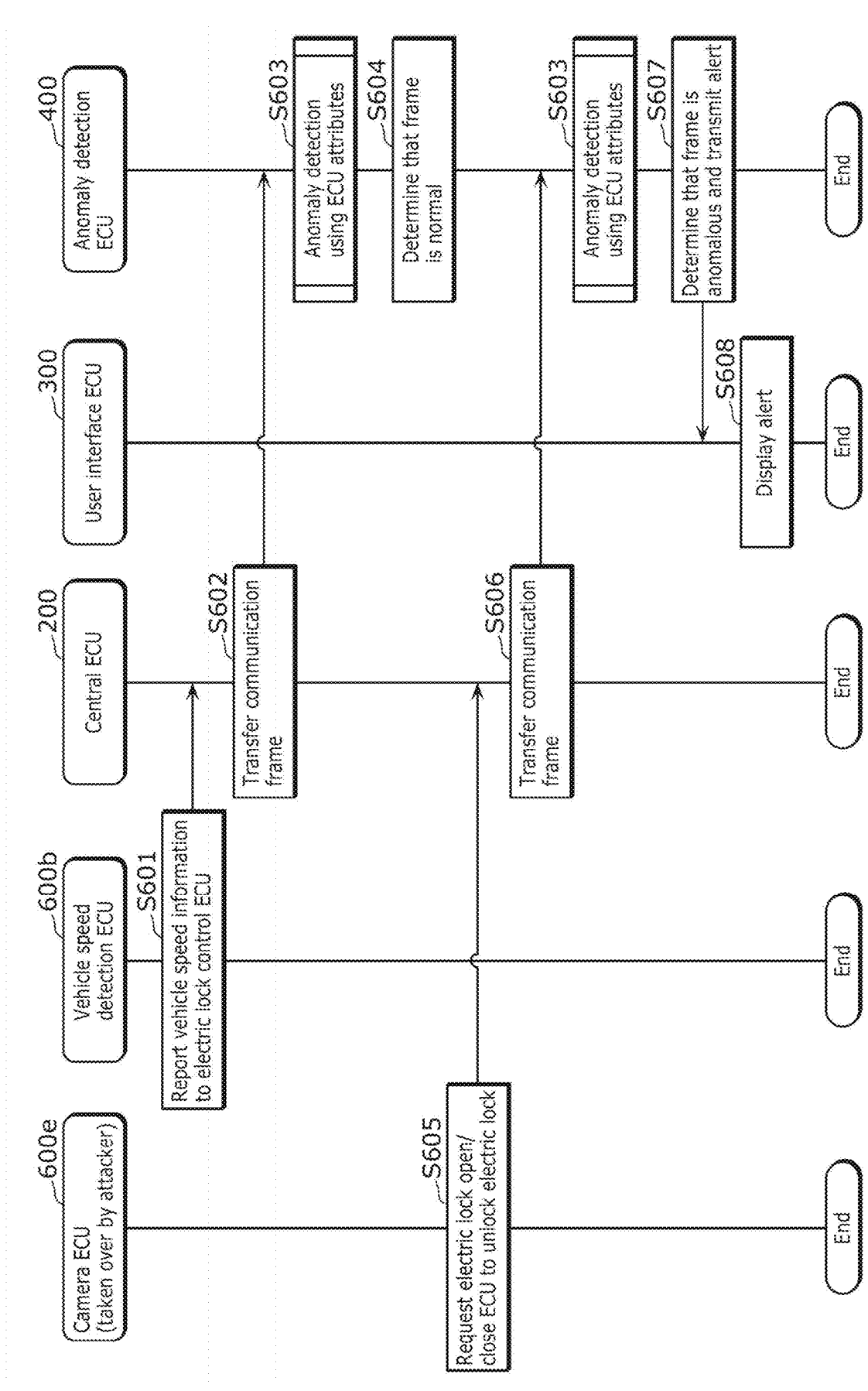
FIG. 18 is a diagram illustrating one example of a sequence about anomaly detection using ECU attributes in Embodiment 1.

FIG. 18 illustrates one example of a sequence about anomaly detection performed by the anomaly detection ECU using the ECU attributes in the present embodiment. Assume that an attacker has taken over the right of access due to vulnerability of camera ECU 600e.

(S601) Vehicle detection ECU 600b transmits the speed information of the vehicle in the form of a SOME/IP message frame to electric lock control ECU 600c. The frame is transmitted to central ECU 200 via zone ECU 500a.

(S602) Central ECU 200 transfers, to anomaly detection ECU 400, the frame (communication frame) received from vehicle speed ECU 600b.

(S603) Anomaly detection ECU 400 confirms that the frame (communication frame) transferred from central ECU 200 is compliant with the service-oriented communication protocol, and performs anomaly detection by determining, using the ECU attributes, whether the frame is anomalous. Details of the anomaly detection process performed by anomaly detection ECU 400 will be described later.

(S604) As a result of the anomaly detection, anomaly detection ECU 400 determines that the frame is normal.

(S605) Camera ECU 600e transmits, to electric lock open/close ECU 600d, the SOME/IP message frame that requests unlocking of an electric lock.

(S606) Central ECU 200 transfers, to anomaly detection ECU 400, the frame (communication frame) obtained from camera ECU 600e.

(S607) As a result of the anomaly detection, anomaly detection ECU 400 determines that the frame is anomalous, and transmits an alert notification frame to user interface ECU 300.

(S608) When user interface ECU 300 receives the alert notification frame, user interface ECU 300 notifies an operator of an alert (displays an alert) via an external device such as a monitor.

18. Flowchart of Anomaly Detection Using ECU Attributes

Figure 19:
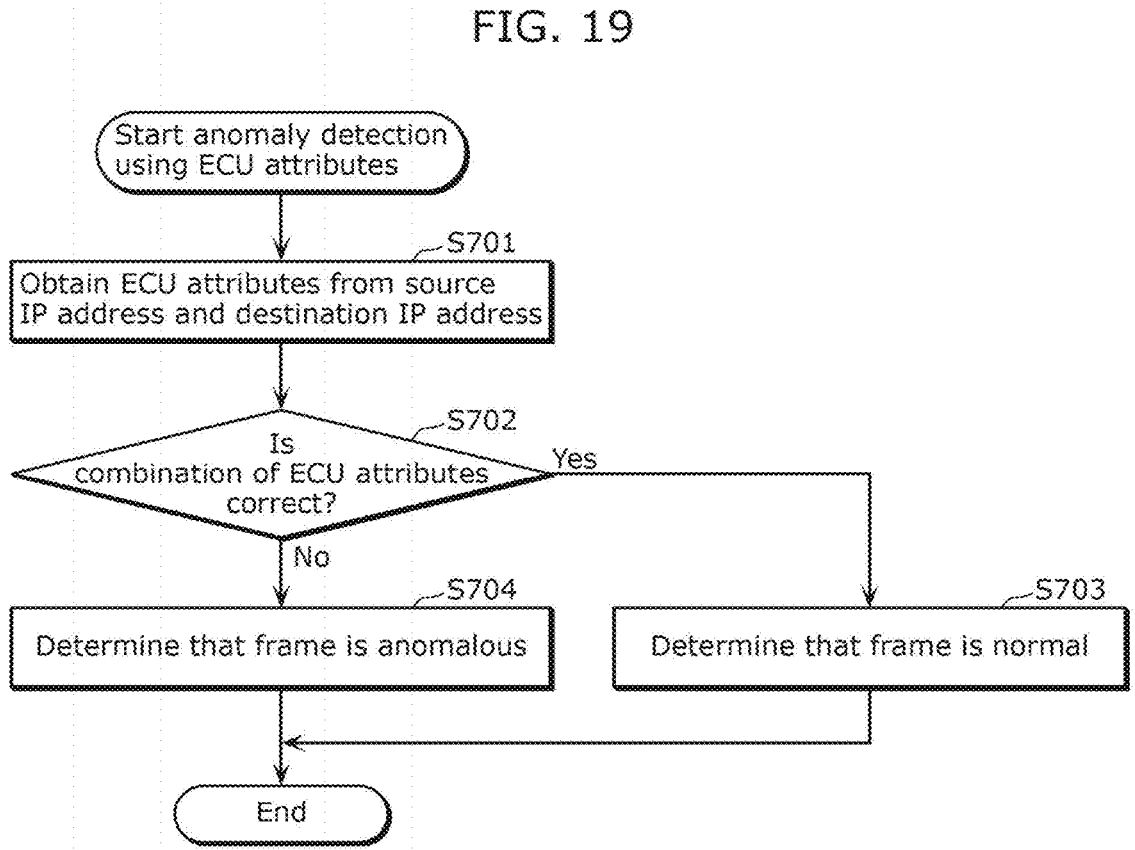
FIG. 19 is a diagram illustrating one example of a flowchart regarding anomaly detection using ECU attributes in Embodiment 1.

FIG. 19 illustrates one example of a flowchart regarding the anomaly detection process performed by anomaly detector 402 according to the present embodiment using the ECU attributes to determine whether there is anomalous communication of a SOME/IP communication frame.

(S701) Anomaly detector 402 obtains the source IP address and the destination IP address included in the received SOME/IP message frame, and obtains the respective ECU attributes of the source IP address and the destination IP address by referring to ECU attribute storage 406.

(S702) Using the anomaly detection rule stored in anomaly detection rule storage 407, anomaly detector 402 determines whether the obtained combination of the ECU attribute of the source IP address and the ECU attribute of the destination IP address is correct.

Specifically, for example, in the case of communication from vehicle detection ECU 600b to electric lock control ECU 600c described with reference to FIG. 18, by referring to the ECU attribute information in FIG. 11 that is stored in ECU attribute storage 406, it can be found that regarding vehicle detection ECU 600b that has the source IP address, the role attribute of the ECU is a sensor and the domain attribute of the ECU is a powertrain and that regarding electric lock control ECU 600c that has the destination IP address, the role attribute of the ECU is a brain and the domain attribute of the ECU is a body. The combination of these ECU attributes is defined as OK in the anomaly detection rule stored in anomaly detection rule storage 407 in FIG. 12. Accordingly, anomaly detector 402 determines that the frame transmitted from vehicle speed detection ECU 600b to electric lock control ECU 600c is a normal frame.

Furthermore, in the case of communication from camera ECU 600e to electric lock open/close ECU 600d described with reference to FIG. 18, by referring to the ECU attribute information in FIG. 11 that is stored in ECU attribute storage 406, it can be found that regarding camera ECU 600e that has the source IP address, the role attribute of the ECU is a sensor and the role attribute of the ECU is ADAS and that regarding electric lock open/close ECU 600d that has the destination IP address, the role attribute of the ECU is an actuator and the role attribute of the ECU is a body. The combination of these ECU attributes is defined as NG in the anomaly detection rule stored in anomaly detection rule storage 407 in FIG. 12. Accordingly, anomaly detector 402 determines that the frame transmitted from camera ECU 600e to electric lock open/close ECU 600d is an anomalous frame.

When anomaly detector 402 determines that the obtained combination of the ECU attribute of the source IP address and the ECU attribute of the destination IP address is correct (Yes in S702), anomaly detector 402 performs the process in Step S703. When anomaly detector 402 determines that the obtained combination of the ECU attribute of the source IP address and the ECU attribute of the destination IP address is not correct (is anomalous) (No in S702), anomaly detector 402 performs the process in Step S704.

(S703) Anomaly detector 402 determines that the received frame is normal.

(S704) Anomaly detector 402 determines that the received frame is anomalous, and transmits a frame to user interface ECU 300 such that user interface ECU 300 displays an alert.

In the case where the attribute setting flags for the source IP address and the destination IP address in ECU attribute storage 406 have been set to ON at the time when the frame is determined as anomalous communication, normal communication may have been falsely detected as anomalous communication in the anomaly detection performed before resetting the ECU attributes. Therefore, in Step S704, anomaly detector 402 may output information indicating whether the attribute setting flags are ON.

Advantageous Effects of Embodiment 1

In the in-vehicle network system described in Embodiment 1, anomaly detection ECU 400 labels each ECU with an ECU attribute indicating what function the ECU has or what information the ECU handles, and further defines, in advance, communication between which of the ECU attributes is anomalous, to detect anomalous communication. This makes it possible to distinguish, no matter which ECUs perform communication therebetween, whether the communication is normal or anomalous, as long as the attribute of the ECU at the source IP address and the attribute of the ECU at the destination IP address are known; thus, security improves.

Furthermore, anomaly detection ECU 400 detects a change in the communication tendency of the in-vehicle network such as a change in the vehicle system settings that is made by an operator or an ECU system update by OTA, and performs ECU attribute labeling at a specific timing. This makes it possible to detect anomalous communication while distinguishing between the case where unusual communication is performed according to the OTA or vehicle system change and the case where unusual communication is performed by an attacker, leading to improved vehicle safety.

As described above, anomaly detection ECU 400 (the anomaly detection device) according to the present embodiment is an anomaly detection device that detects an anomaly in the in-vehicle network system including two or more ECUs and one or more networks. Anomaly detection ECU 400 includes ECU attribute storage 406, communicator 401, and anomaly detector 402. In ECU attribute storage 406, attributes of the two or more ECUs are stored each of which is set for a corresponding one of the two or more ECUs. Communicator 401 transmits and receives messages on the one or more networks. Anomaly detector 402 detects anomalous communication by using the attribute of the ECU at the source of the message (the source IP address) or the destination of the message (the destination IP address) among the attributes stored in ECU attribute storage 406. Each of the attribute stored in ECU attribute storage 406 indicates the function of the ECU including the attribute or the type of information that is handled by the ECU including the attribute.

Thus, when ECUs are transferring a message, whether the message being transferred is anomalous can be determined by referring to the attributes indicating the function of each of the ECUs and the type of information that is handled by the ECU; thus, it is possible to improve the safety of vehicle 10.

In anomaly detection ECU 400 according to the present embodiment, each of the attributes stored in ECU attribute storage 406 indicates the function of an ECU that operates in the in-vehicle network system. The attributes include any one of a sensor attribute, a brain attribute, and an actuator attribute. The sensor attribute indicates that the ECU includes the function of sensing information on the inside and outside of the vehicle. The brain attribute indicates that the ECU includes the function of processing the sensed information and providing a control instruction. The actuator attribute indicates that the ECU includes the function of performing control according to the control instruction.

With this, whether the communication is anomalous can be determined from the relationship between the functions of ECUs; thus, it is possible to improve vehicle safety.

In anomaly detection ECU 400 according to the present embodiment, each of the attributes stored in the ECU attribute storage indicates the type of information that is handled by the ECU in the in-vehicle network system. The attributes include any one of a powertrain attribute, an infotainment attribute, a body attribute, an ADAS attribute, and a connectivity attribute. The powertrain attribute indicates handling of control information regarding travel of the vehicle. The infotainment attribute indicates handling of information regarding a notification about the state of the vehicle to an operator. The body attribute indicates handling of control information about the body of the vehicle. The ADAS attribute indicates handling of information regarding the advanced driver assist function that assists or replaces a vehicle operation being performed by the operator. The connectivity attribute indicates handling of information obtained from the outside of the one or more networks.

With this, whether the communication is anomalous can be determined from the relationship between the types of information being handled by ECUs; thus, it is possible to improve vehicle safety.

In anomaly detection ECU 400 according to the present embodiment, anomaly detector 402 determines, based on the combination of the attribute of the ECU at the source of a frame (message) and the attribute of the ECU at the destination of the frame, whether the message received by communicator 401 is anomalous.

With this, whether the communication is anomalous can be determined based on the combination of the attributes of ECUs at the source of the frame and the destination of the frame; thus, it is possible to improve the safety of vehicle 10.

In anomaly detection ECU 400 according to the present embodiment, anomaly detector 402 determines, based on the relationship between the attribute of the ECU at the source of the frame (message) or the attribute of the ECU at the destination of the frame and information included in the frame received from the communicator, whether the frame received by communicator 401 is anomalous.

With this, whether the communication is anomalous can be determined even in the case of a falsified message transmission attack; thus, it is possible to improve vehicle safety.

In anomaly detection ECU 400 according to the present embodiment, messages are transferred by service-oriented communication in the in-vehicle network system. The information included in the message received from communicator 401 is information stored in a SOME/IP communication message format.

With this, whether the communication is anomalous can be determined from the relationship between the information stored in the SOME/IP communication message format and the attribute of the ECU; thus, it is possible to improve vehicle safety.

Anomaly detection ECU 400 according to the present embodiment further includes communication log storage 404. Communication log storage 404 stores the frame (message) received by communicator 401. By referring to ECU attribute storage 406 and the frame (message) stored in communication log storage 404, anomaly detector 402 specifies the relationship indicating the combination of the attributes of ECUs at the source and the destination between which the frame (message) has been transferred. Anomaly detector 402 determines that a newly received frame (message) is normal when the newly received frame (message) is a message transferred between ECUs that include the combination of the attributes in the relationship with which a frame (message) has been transferred, and determines that a newly received frame (message) is anomalous when the newly received frame (message) is a message transferred between ECUs that include the combination of the attributes in the relationship with which a frame (message) has not been transferred.

With this, the definition of anomalous communication using ECU attributes can be mechanically generated from the communication log; thus, it is possible to automatically update the definition of anomalous communication.

In anomaly detection ECU 400 according to the present embodiment, messages are transferred by service-oriented communication in the in-vehicle network system. Anomaly detection ECU 400 further includes communication log storage 404 and ECU attribute setter 405. Communication log storage 404 stores the frame (message) received by communicator 401. ECU attribute setter 405 sets an attribute of an ECU to be stored into ECU attribute storage 406. By referring to the frame (message) stored in communication log storage 404, ECU attribute setter 405 determines, from the message type included in the frame (message), whether an ECU is on the server side or the client side, and determines the attribute of the ECU according to the ratio between the server communication and the client communication.

With this, the attribute of the ECU can be defined from the communication log; thus, it is possible to automatically update the attribute of the ECU.

Anomaly detection ECU 400 according to the present embodiment further includes communication log storage 404 and ECU attribute setter 405. Communication log storage 404 stores the frame (message) received by communicator 401. By referring to the frame (message) stored in communication log storage 404, ECU attribute setter 405 sets an attribute of an ECU stored in ECU attribute storage 406. By referring to ECU attribute storage 406 and the frame (message) stored in communication log storage 404, ECU attribute setter 406 determines an attribute of a first ECU according to the frequency of occurrence of the attribute of an ECU with which the first ECU communicates.

With this, the attribute of the ECU can be defined from the communication log; thus, it is possible to automatically update the attribute of the ECU.

In anomaly detection ECU 400 according to the present embodiment, ECU attribute setter 405 determines an attribute of the ECU when one of the following conditions is satisfied: a predetermined time has elapsed since determination of the attribute of the ECU; and communicator 401 has received a frame (a message) that causes a change in the communication tendency of the one or more networks.

This allows for anomaly detection corresponding to the latest state of the in-vehicle network, preventing the problem of false detection increasing with time; thus, it is possible to improve vehicle safety.

In anomaly detection ECU 400 according to the present embodiment, the frame (message) that causes a change in the communication tendency of the one or more networks is:

a message generated upon obtaining and installing data from a network or a server different from the in-vehicle network; or a message generated upon changing, deleting, or updating the function settings of the in-vehicle system.

With this, a change in the in-vehicle network such as obtaining data from an external device and installing the data or changing the function settings of an in-vehicle system can be detected, and the attribute of the ECU can be set again; thus, it is possible to reduce false anomaly detections.

In anomaly detection ECU 400 according to the present embodiment, anomaly detector 402 calculates, from the frame (message) stored in communication log storage 404, the frequency of occurrence of the attribute of an ECU with which the first ECU communicates, refers to the frequency of occurrence of the attribute of the first ECU stored in ECU attribute storage 406, and when the frequency of occurrence calculated is different by more than a predetermined reference from the frequency of occurrence referred to, determines that communication performed by the first ECU is anomalous.

With this, anomalous communication can be detected in consideration of the tendency of occurrence of the attributes of the entire ECUs in the in-vehicle network; thus, it is possible to detect an anomaly such as a sharp increase in data traffic from a specific ECU.

Variation 1 of Embodiment 1

In anomaly detection ECU 400 in the in-vehicle network system described in Embodiment 1, the anomaly detection rule is defined in anomaly detection rule storage 407 in advance from the relationship between the ECU attribute of the source IP address and the ECU attribute of the destination IP address as an example, but the anomaly detection rule may be defined in advance from the relationship between the ECU attribute of the source IP address and a feature amount of a communication frame.

Note that in the present variation, drawings that are substantially the same as those provided in Embodiment 1 will be omitted, and thus the following discussion will focus on one example of an anomaly detection rule to be stored in anomaly detection rule storage 407 and how to determine, using the anomaly detection rule, that a frame is anomalous.

19. Anomaly Detection Using ECU Attribute of Source ECU and Communication Content FIG. 20 is a diagram illustrating one example of an anomaly detection rule that is stored in the anomaly detection rule storage and in which the ECU attribute of the ECU at the source IP address and the frame compliant with the service-oriented communication protocol are used.

As illustrated in FIG. 20, the maximum value and minimum value of the message size of the frame are stored in association with the combination of the role attribute and the domain attribute of the ECU at the source IP address. For example, this figure shows that an ECU having a domain attribute of connectivity and a role attribute of a sensor transmits a frame with a minimum message size of 500 bytes and a maximum message size of 600 bytes. These values may be set in advance through investigation of the in-vehicle network or alternatively a communication log including data recorded for a predetermined time may be extracted from communication log storage 404 at a specific timing and information regarding the maximum value and the minimum value specified with reference to the message size may be stored as these values.

Figure 21:
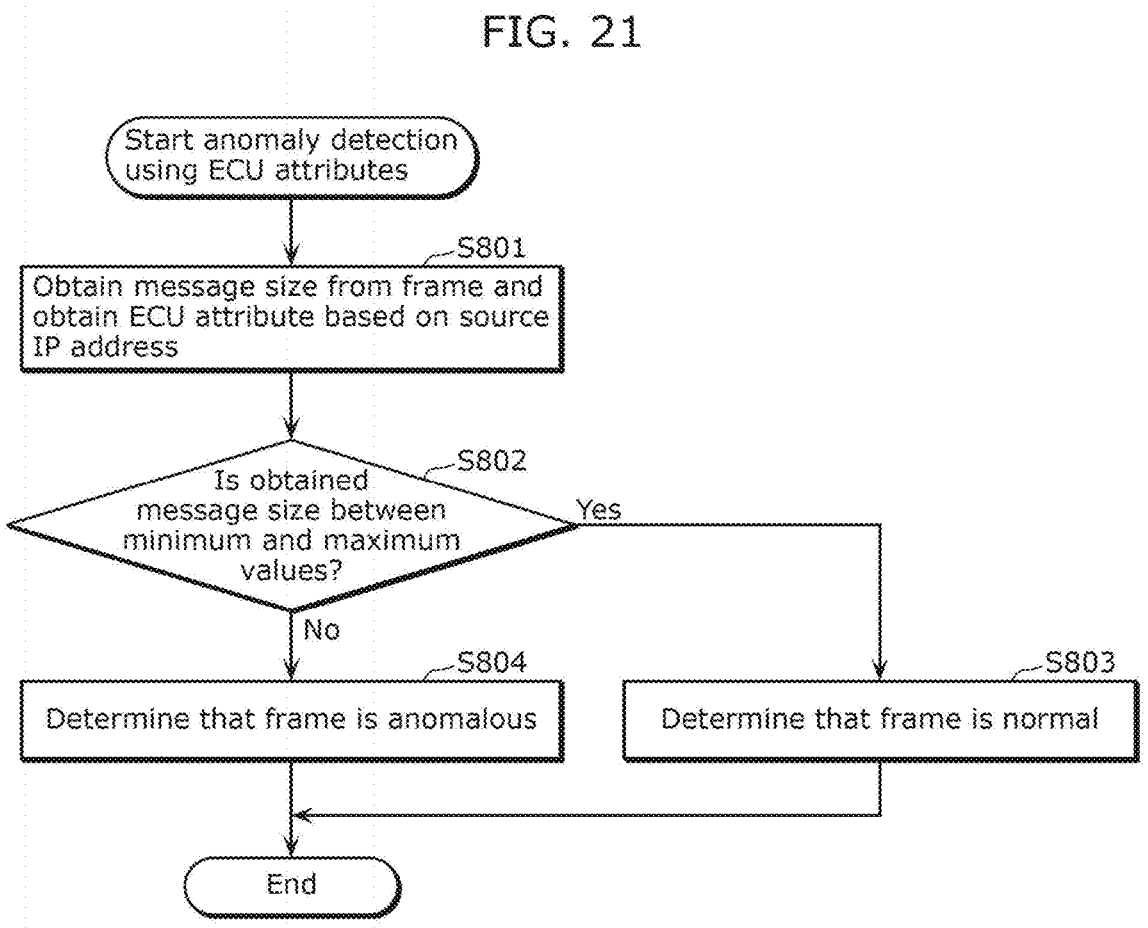
FIG. 21 is a diagram illustrating one example of a flowchart regarding anomaly detection using source ECU attributes and a frame in Variation 1 of Embodiment 1.

FIG. 21 illustrates one example of a process flow associated with Step S603 in FIG. 18 modified into a process flow in which an anomaly is detected using the ECU attribute of the ECU at the source IP address and the message size of the frame.

(S801) Anomaly detector 402 obtains a source IP address included in the received SOME/IP communication message frame, and obtains an ECU attribute by referring to ECU attribute storage 406. Furthermore, anomaly detector 402 obtains a message size by referring to Length in the SOME/IP message format of said frame.

(S802) Anomaly detector 402 refers to the minimum value and the maximum value of the message size in anomaly detection rule storage 407 that correspond to the ECU attribute of the source IP address obtained, and determines whether the message size of the message obtained has a value between the minimum value and the maximum value. When the obtained message size has a value between the minimum value and the maximum value (Yes in S802), anomaly detector 402 performs the process in Step S803. When the obtained message does not have a value between the minimum value and the maximum value (No in S802), anomaly detector 402 performs the process in Step S804.

(S803) Anomaly detector 402 determines that the received frame is normal.

(S804) Anomaly detector 402 determines that the received frame is anomalous, and transmits a frame to user interface ECU 300 such that user interface ECU 300 displays an alert.

The foregoing has described an example in which anomaly detector 402 uses the maximum value and the minimum value of the message size in the anomaly detection, but another evaluation index may be used; for example, when the deviation from the mean or median of message sizes is greater than or equal to a threshold value, it is determined that there is an anomaly.

In the anomaly detection rule, an anomaly is defined from the relationship between the message size of the frame and the ECU attribute of the ECU at the source IP address, but an anomaly may be defined from the relationship between the message size of the frame and the ECU attribute of the ECU at the destination IP address, or an anomaly may be defined from the message size of the frame and the ECU attributes of the ECU at the source IP address and the ECU at the destination IP address.

Alternatively, in the anomaly detection rule, an anomaly may be defined from the relationship between the ECU attribute and the message ID, the service ID, or the message type stored in the frame instead of the message size of the frame. For example, the anomaly detection rule may be defined by specifying the message ID of a frame that is transmitted when the ECU attributes of the ECU at the source IP address are a body and an actuator, and when a frame including undefined message ID is transmitted, anomaly detector 402 may determine that said frame is anomalous.

Advantageous Effects of Variation 1 of Embodiment 1

With the anomaly detection method for the in-vehicle network system described in Variation 1 of Embodiment 1, when an attacker tampers with information included in a frame and transmits the anomalous frame, anomaly detection ECU 400 can detect the anomalous frame; thus, security improves.

Variation 2 of Embodiment 1

In anomaly detection ECU 400 in the in-vehicle network system described in Embodiment 1, the anomaly detection rule is defined in anomaly detection rule storage 407 in advance as an example, but anomaly determination may be made with reference to the past communication log stored in communication log storage 404 without referring to anomaly detection rule storage 407. Note that description of drawings that are substantially the same as those provided in Embodiment 1 will be omitted, and thus the following discussion will show one example of a flowchart of anomaly detection with different elements and focus on frame anomaly detection.

Figure 22:
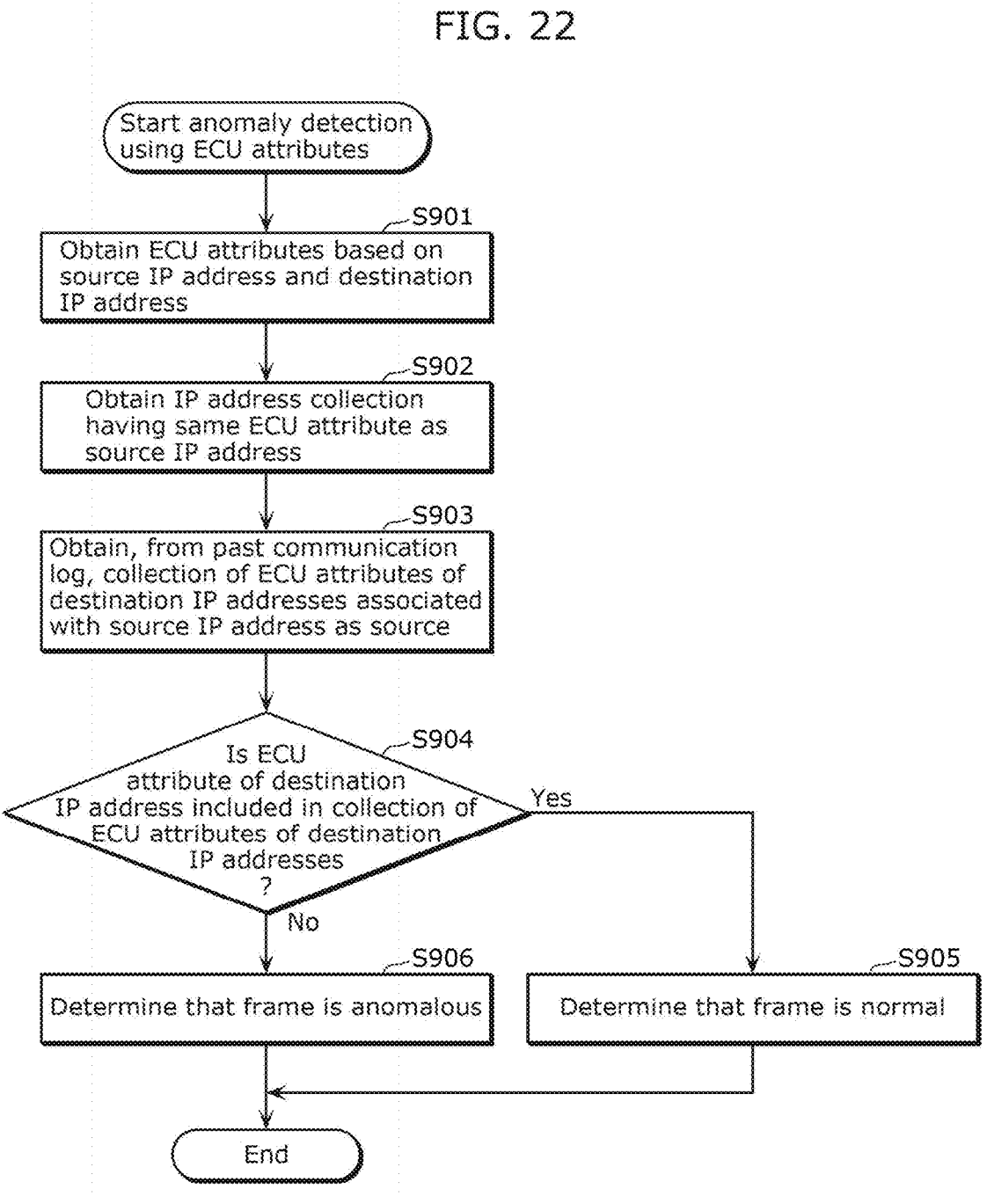
FIG. 22 is a diagram illustrating one example of a flowchart regarding anomaly detection using ECU attributes in Variation 2 of Embodiment 1.

20. Anomaly Detection Using ECU Attribute of Source IP Address and Communication Logs FIG. 22 illustrates one example of the process flow associated with Step S603 in FIG. 18 modified into a process flow in which an anomaly is detected using the communication logs stored in communication log storage 404.

(S901) Anomaly detector 402 obtains the source IP address and the destination IP address included in the received SOME/IP message frame, and obtains the respective ECU attributes of the source IP address and the destination IP address by referring to ECU attribute storage 406.

(S902) By referring to ECU attribute storage 406, anomaly detector 402 obtains an IP address collection having the same ECU attribute as the obtained ECU attribute of the source IP address.

(S903) Anomaly detector 402 obtains communication logs including data recorded for a predetermined time and stored in communication log storage 404, refers to the ECU attributes of the destination IP addresses included in the communication logs including the obtained source IP address as a source of communication, and obtains a collection of the ECU attributes of the destination IP addresses.

(S904) Anomaly detector 402 determines whether the obtained ECU attribute of the destination IP address is included in the obtained collection of the ECU attributes of the destination IP addresses. When the obtained ECU attribute of the destination IP address is included in the obtained collection of the ECU attributes of the destination IP addresses (Yes in S904), anomaly detector 402 performs the process in Step S905. When the obtained ECU attribute of the destination IP address is not included in the obtained collection of the ECU attributes of the destination IP addresses (No in S904), anomaly detector 402 performs the process in Step S906.

(S905) Anomaly detector 402 determines that the received frame is normal.

(S906) Anomaly detector 402 determines that the received frame is anomalous, and transmits a frame to user interface ECU 300 such that user interface ECU 300 displays an alert.

In the present variation, the focus is on the ECU attribute of the source IP address, and what ECU attribute the destination IP address includes is checked in the past communication logs stored in communication log storage 404, but the focus may be on the ECU attribute of the destination IP address, and what ECU attribute the source IP address includes may be checked in the past communication log stored in communication log storage 404. Alternatively, both of these checks may be combined.

Advantageous Effects of Variation 2 of Embodiment 1

In the anomaly detection method for the in-vehicle network system described in Variation 2 of Embodiment 1, since there is no need to define the anomaly detection rule in advance and the anomaly detection is performed in consideration of the communication tendency of the in-vehicle network based on the past communication logs collected, it is possible to increase the accuracy of anomaly detection by creating an appropriate anomaly detection rule for the communication tendency of each vehicle.

Variation 3 of Embodiment 1

In anomaly detection ECU 400 in the in-vehicle network system described in Embodiment 1, one domain attribute of the IP address is selected and stored into ECU attribute storage 406 as discussed with reference to FIG. 17 as an example, the domain attribute of the IP address may be set assuming that the IP address has more than one domain attribute. Note that description of drawings that are substantially the same as those provided in Embodiment 1 will be omitted, and thus the following discussion will focus on how a frame is determined as anomalous when the ECU has more than one domain attribute as a result of addition of a new function to the IP address, using a sequence about attribute addition for the IP address, a flowchart of domain attribute setting for the IP address, one example of ECU attribute information that is stored in ECU attribute storage 406, and a flowchart of anomaly detection using ECU attributes, which include elements different from those in the above-described embodiment.

21. One Example of Sequence about ECU Attribute Addition

Figure 23:
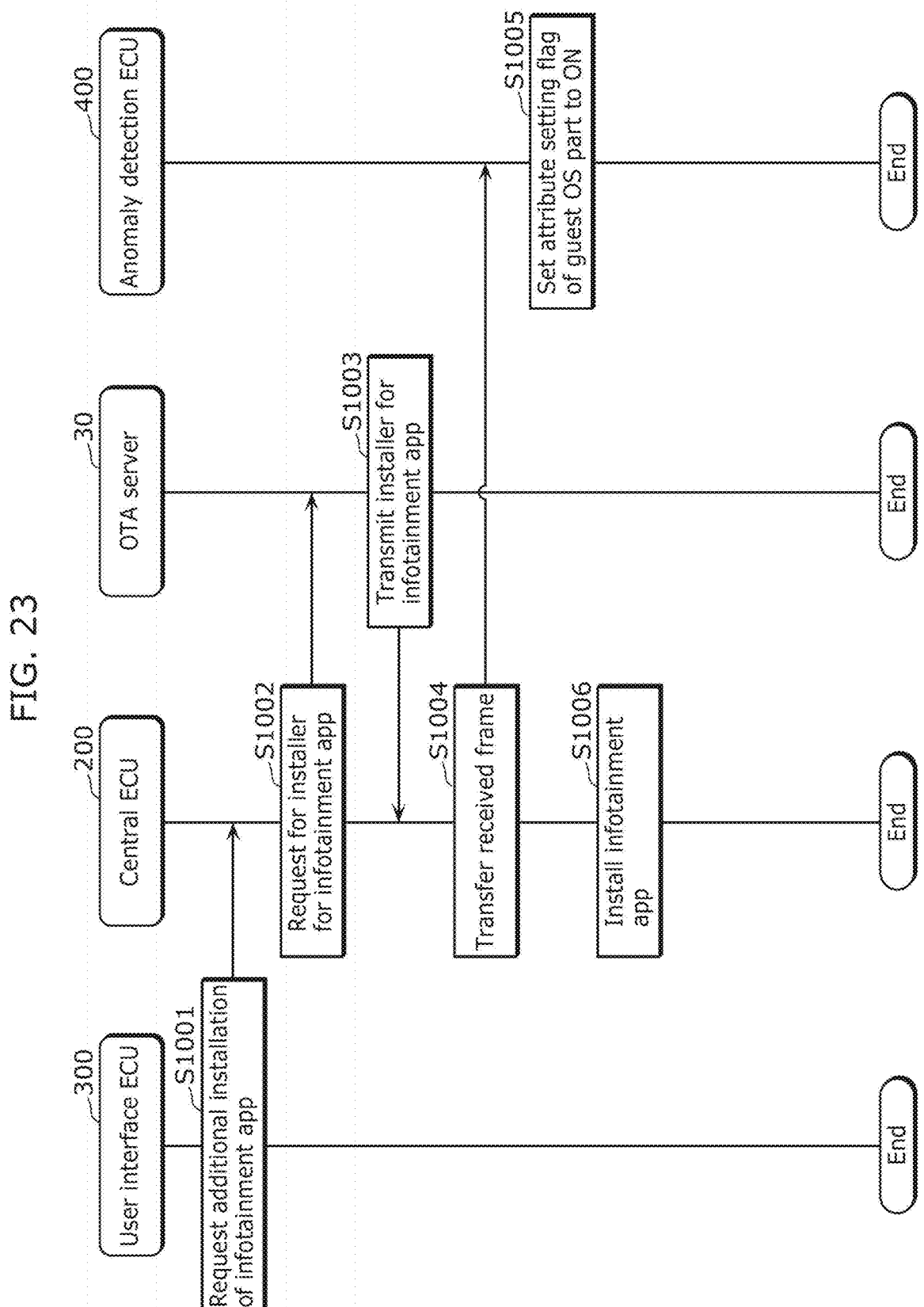
FIG. 23 is a diagram illustrating one example of a sequence about ECU attribute addition in Variation 3 of Embodiment 1.

FIG. 23 illustrates one example of a sequence in which anomaly detection ECU 400 detects a change in the in-vehicle network and resets the ECU attribute information to be used for the anomaly detection when an operator operates the touch panel of user interface ECU 300 and installs an application regarding infotainment in addition to an application regarding ADAS installed on guest OS part 203 of central ECU 200.

(S1001) User interface ECU 300 accepts a user operation and requests guest OS part 203 of central ECU 200 to newly install an application regarding infotainment (infotainment app).

(S1002) Central ECU 200 requests OTA server 30 to transmit an installer for the application regarding infotainment (infotainment app) to guest OS part 203.

(S1003) OTA server 30 transmits the installer for the application regarding infotainment (infotainment app) to guest OS part 203 of central ECU 200.

(S1004) Central ECU 200 transfers the received frame to anomaly detection ECU 400.

(S1005) Anomaly detector 402 of anomaly detection ECU 400 receives a frame representing the transmission of the installer from OTA server 30 to guest OS part 203, and obtains the destination IP address stored in the frame. Furthermore, anomaly detector 402 refers to the IP addresses stored in ECU attribute storage 406 and when the obtained IP address is included in said IP addresses, sets an attribute setting flag corresponding to the IP address to ON.

(S1006) Central ECU 200 installs the infotainment application.

22. One Example of Sequence Regarding ECU Attribute Setting

FIG. 24 illustrates one example of the ECU attribute information that is stored in ECU attribute storage 406 when the IP address has more than one domain attribute. As in FIG. 11, the combination of an IP address, an ECU attribute, an attribute setting flag, flag-OFF setting date and time, and flag-ON setting date and time is indicated in one row. As compared with one example of the ECU attribute information illustrated in FIG. 11, a powertrain attribute of 0.8, an ADAS attribute of 0.1, and a body attribute of 0.1 are stored for the brake control ECU, which indicates that the brake control ECU has the three domain attributes. The stored values represent the ratio between the domain attributes; a greater value indicates a higher likelihood of communication related to that domain attribute.

Figure 25:
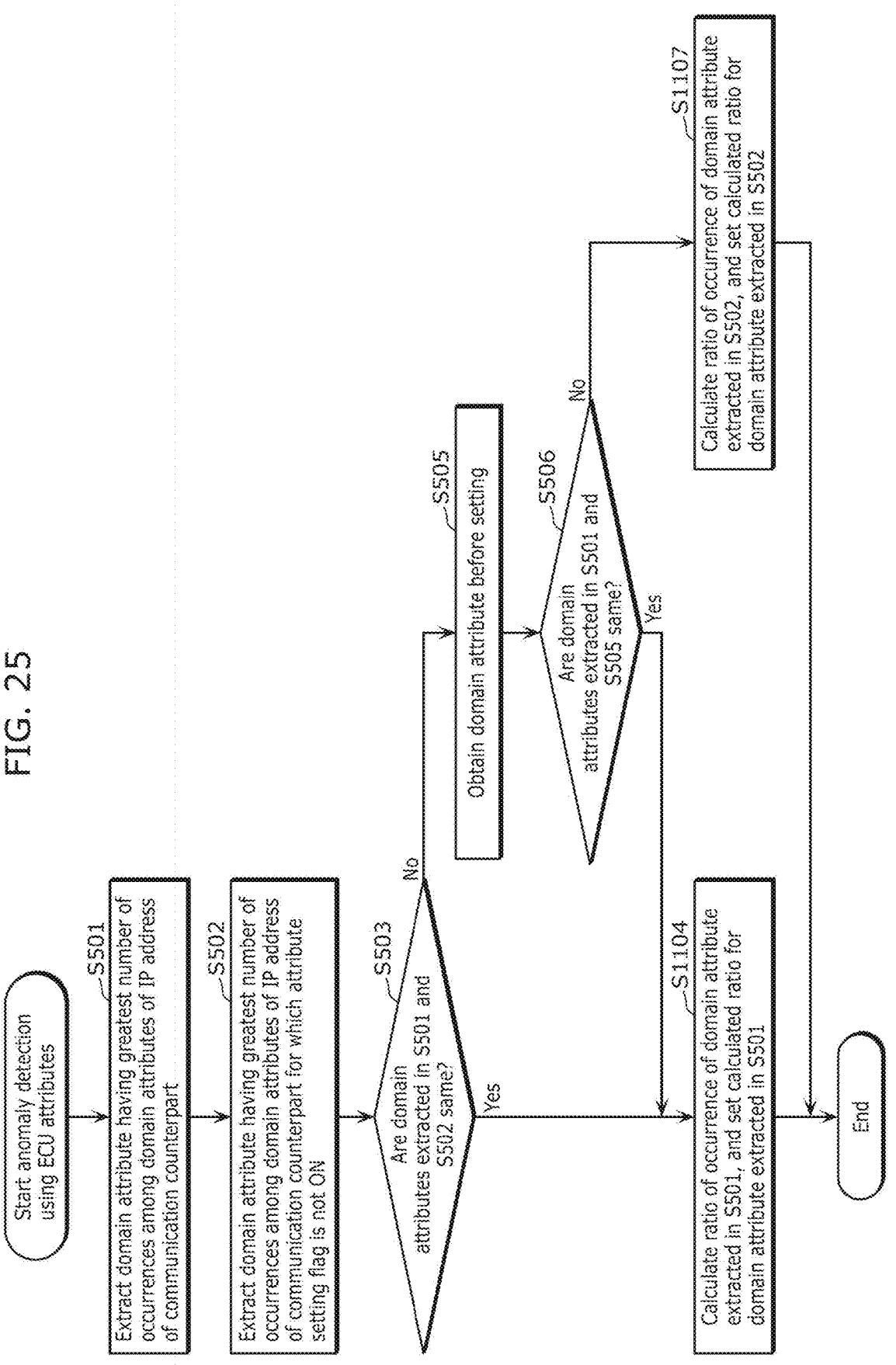
FIG. 25 is a diagram illustrating one example of a flowchart regarding ECU domain attribute setting in Variation 3 of Embodiment 1.

FIG. 25 illustrates a process flow in which the domain attribute of the IP address is set assuming that the IP address may have more than one domain attribute, instead of selecting one domain attribute of the IP address in the process flow regarding the domain attribute setting for the IP address in FIG. 17. Note that process steps that are the same as those in Embodiment 1 will be assigned the same numerals as those in Embodiment 1 and thus, description thereof will be omitted.

(S1104) When the determination made in Step S503 is Yes, ECU attribute setter 405 calculates a ratio of occurrence of a domain attribute by dividing the number of occurrences of the domain attribute extracted in Step S501 by the total number of occurrences of the domain attribute of the IP address of the communication counterpart in Step S501, and sets, in ECU attribute storage 406, the calculated ratio of occurrence of the domain attribute that is the domain attribute extracted in Step S501.

(S1107) When the determination made in Step S506 is No, ECU attribute setter 405 calculates a ratio of occurrence of a domain attribute by dividing the number of occurrences of the domain attribute extracted in Step S502 by the total number of occurrences of the domain attribute of the IP address of the communication counterpart for which the attribute setting flag is not ON in Step S502, and sets, in ECU attribute storage 406, the calculated ratio of occurrence of the domain attribute that is the domain attribute extracted in Step S502.

Figure 26:
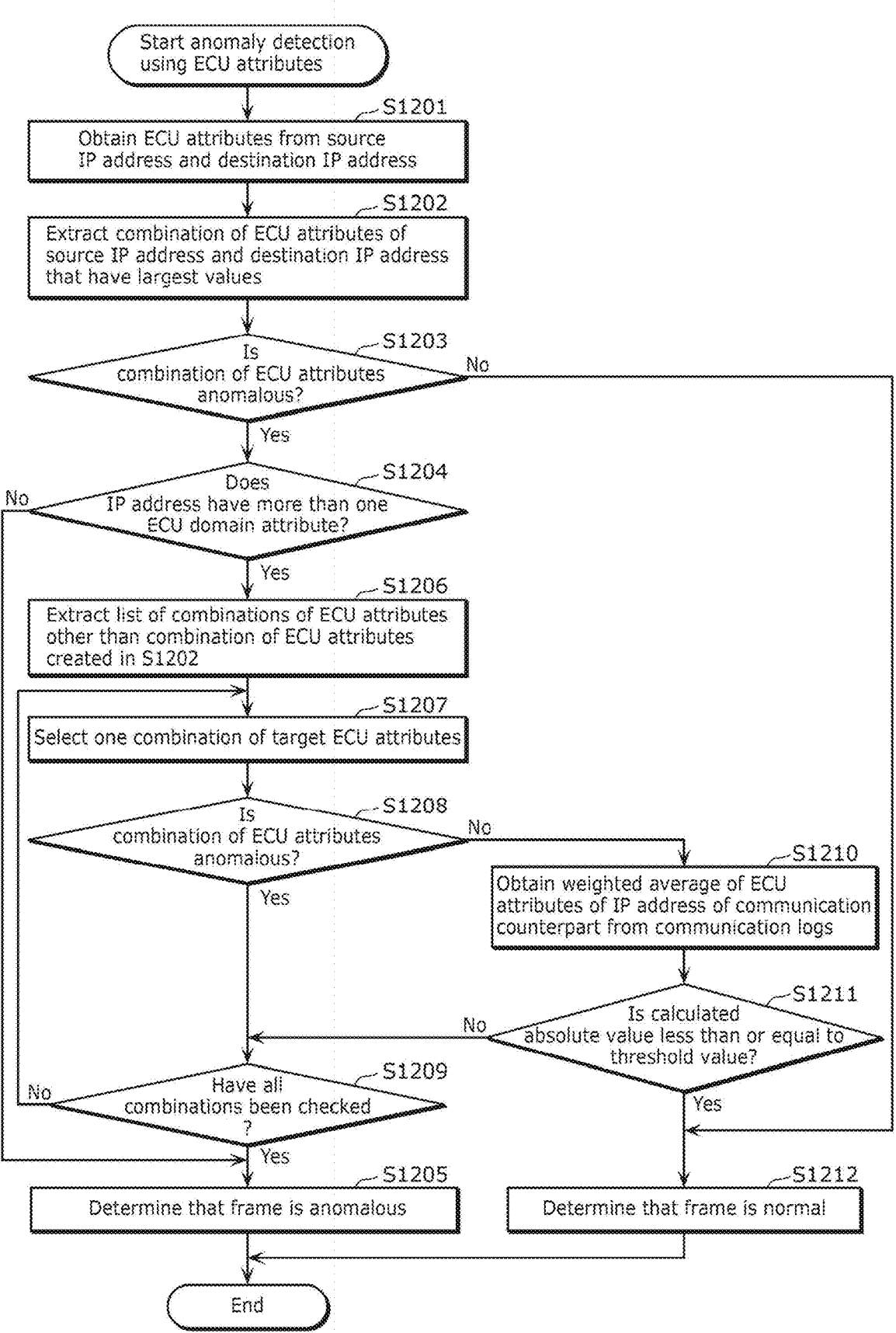
FIG. 26 is a diagram illustrating one example of a flowchart regarding anomaly detection using ECU attributes in Variation 3 of Embodiment 1.

23. One Example of Flowchart Regarding Anomaly Detection Using ECU Attributes FIG. 26 illustrates one example of the process flow associated with Step S603 in FIG. 18 modified into a process flow to be applied when the IP address has more than one domain attribute.

(S1201) Anomaly detector 402 obtains the source IP address and the destination IP address included in the received frame, and obtains the respective ECU attributes of the obtained IP addresses by referring to ECU attribute storage 406.

(S1202) Anomaly detector 402 refers to the respective values of the ECU attributes of the obtained IP addresses, extracts an attribute having the largest value stored as each of the role attribute and the domain attribute of the ECU at the source IP address and an attribute having the largest value stored as each of the role attribute and the domain attribute of the ECU at the destination IP address, and creates a combination of the ECU attributes of the source IP address and the destination IP address.

For example, in FIG. 24, when the ECU at the source IP address is a vehicle speed detection ECU, the role attribute of the ECU that has the largest value, that is, 1, is a sensor and the domain attribute of the ECU that has the largest value, that is, 0.7, is a powertrain, and thus a sensor and a powertrain are extracted as the role attribute and the domain attribute of the ECU at the source IP address, respectively.

In FIG. 24, when the ECU at the destination IP address is a brake control ECU, a brain and a powertrain are extracted as the role attribute and the domain attribute of the ECU at the destination IP address, respectively.

(S1203) Using the anomaly detection rule stored in anomaly detection rule storage 407, anomaly detector 402 determines, based on the combination of the extracted ECU attributes, whether the communication is anomalous. When the combination of the extracted ECU attributes is determined as anomalous (Yes in S1203), anomaly detector 402 performs the process in Step S1204. When the combination of the extracted ECU attributes is determined as normal (No in S1203), anomaly detector 402 performs the process in Step S1212.

(S1204) Anomaly detector 402 determines whether at least one of the source IP address and the destination IP address has more than one domain attribute. When neither the source IP address nor the destination IP address has more than one domain attribute (No in S1204), anomaly detector 402 performs the process in S1205. When one of the source IP address and the destination IP address has more than one domain attribute (Yes in S1204), anomaly detector 402 performs the process in Step S1206.

(S1205) Anomaly detector 402 determines that the received frame is anomalous, and transmits a frame to user interface ECU 300 such that user interface ECU 300 displays an alert.

(S1206) Anomaly detector 402 creates a combination of the ECU attributes that is different from the combination of the ECU attributes created in Step S1202.

For example, in FIG. 24, when the ECU at the source IP address is a vehicle detection ECU, there are three combinations of the role attribute and the domain attribute of the ECU at the source IP address as follows: a sensor and a powertrain; a sensor and ADAS; and a sensor and a body.

Furthermore, in FIG. 24, when the ECU at the destination IP address is a brake control ECU, there are two combinations of the role attribute and the domain attribute of the ECU at the destination IP address as follows: a brain and a powertrain; and a brain and ADAS.

Therefore, there are six combinations of the ECU attributes of the source IP address and the destination IP address, and anomaly detector 402 extracts, as a list, five combinations except the combination of the ECU attributes extracted in Step S1202.

(S1207) Anomaly detector 402 selects one combination from the list of the combinations of the ECU attributes extracted.

(S1208) Regarding the combination of the ECU attributes selected in Step S1207, anomaly detector 402 determines, according to the detection rule stored in anomaly detection rule storage 407, whether the communication is anomalous. When it is determined that the communication is anomalous (Yes in S1208), Step S1209 is performed. When it is determined that the communication is normal (No in S1208), Step S1210 is performed.

(S1209) Anomaly detector 402 determines whether all the combinations of the ECU attributes in the extracted list have been selected. When all the combinations of the ECU attributes in the extracted list have been selected (Yes in S1209), anomaly detector 402 performs the process in Step S1205, and when not all the combinations of the ECU attributes in the extracted list have been selected (No in S1209), anomaly detector 402 performs the process in Step S1207.

(S1210) Anomaly detector 402 refers to communication log storage 404, obtains a predetermined number of communication logs in descending order of the value of the timestamp, that is, in reverse chronological order of communication log recording, and makes a calculation on how often and to which IP address the source IP address obtained in Step S1201 has transmitted data in the past. Furthermore, a weighted average is calculated using the ECU attribute of the destination IP address as a weight and the total number of occurrences of the destination IP address as a total weight. Furthermore, the absolute value of the difference between the values of each element of the domain attribute is calculated from the obtained weighted average and the ECU attribute of the source IP address.

For example, when the source IP address in Step S1201 is 192.168.1.1, eight events of data transmission from 192.168.1.1 to 192.168.1.2 and two events of data transmission from 192.168.1.1 to 192.168.1.11 are stored in communication log storage 404, the weighted average of the ECU attribute of the destination ECU can be calculated from the sum of a value obtained by multiplying the ECU attribute of 192.168.1.2 by 0.8 and a value obtained by multiplying the ECU attribute of 192.168.1.11 by 0.2 as the number of events of data transmission is a weight. Specifically, when this example is applied to FIG. 24, the weighted averages of the domain attribute of the destination ECU for 192.168.1.1 are connectivity (0), powertrain (0.58), ADAS (0.16), body (0.26), and infotainment (0). Since the ECU attribute of 192.168.1.1 is connectivity (0), powertrain (0.8), ADAS (0.1), body (0.1), and infotainment (0), the absolute values of the differences between the values of the elements of the domain attribute are connectivity (0), powertrain (0.22), ADAS (0.06), body (0.16), and infotainment (0).

(S1211) Anomaly detector 402 refers to the absolute value of the domain attribute calculated in Step S1210 that corresponds to the domain attribute of the destination ECU in the combination selected in Step S1207, and determines whether the absolute value is less than or equal to a threshold value. When the calculated absolute value is less than or equal to the threshold value (Yes in S1211), anomaly detector 402 performs the process in Step S1212. When the calculated absolute value exceeds the threshold value (No in S1211), anomaly detector 402 performs the process in Step S1209.

(S1212) Anomaly detector 402 determines that the received frame is normal.

Advantageous Effects of Variation 3 of Embodiment 1

With the anomaly detection method for the in-vehicle network system described in Variation 3 of Embodiment 1, when the ECU has more than one domain attribute and frame communication is performed, the anomaly detection rule can be applied assuming more than one communication pattern. With this, even when another domain attribute is added to the ECU by OTA later on, the anomaly detection ECU can make anomaly determination in consideration of the fact that the ECU has more than one domain attribute.

24. Other Variations

The present disclosure has been described thus far based on the above embodiment, but it goes without saying that the present disclosure is not limited to the above embodiment. The following examples are also intended to be included within the scope of the present disclosure.

(1) In the above embodiment, the Ethernet and CAN protocols are used for the in-vehicle network, but this is not limiting. For example, a CAN with flexible data-rate (CAN-FD), a local interconnect network (LIN), a media oriented systems transport (MOST), or the like may be used. Alternatively, a network configuration including these networks combined as sub-networks may also be used.

(2) In the above embodiment, three role attributes, sensor/brain/actuator, of the ECU are defined on the basis of the ratio between client communication and server communication and whether a Response message is returned without fail when a Request message is received, and each ECU is labeled by a role attribute, but this is not limiting. For example, using three message types that are Notification, Request, and Response, instead of the ratio between client communication and server communication, more than one label may be defined from the ratio between the message types of a frame transmitted.

(3) In the above embodiment, three role attributes, sensor/brain/actuator, of the ECU are determined on the basis of the ratio between client communication and server communication based on the message type in the SOME/IP communication, but this is not limiting. By referring to the SOME/IP-SD message, the ratio between client communication and server communication may be calculated according to whether an Offer message has been transmitted or whether a Subscribe message has been transmitted, for example.

(4) In the above embodiment, five domain attributes, powertrain/infotainment/body/ADAS/connectivity, of the ECU are defined, and each ECU is labeled, but this is not limiting. In the definition of the domain attribute, the ADAS attribute may be divided into two attributes by distinguishing between an ECU that performs communication at the time of fully autonomous travel and an ECU that performs communication at the time of assisting operator's driving.

(5) In the above embodiment, anomaly detection ECU 400 uses one communication frame to determine whether the communication frame is anomalous, according to the combination of the attribute of the ECU at the source IP address and the attribute of the ECU at the destination IP address, for example, but anomaly detection ECU 400 may use more than one communication frame to determine whether there is anomalous communication. For example, generated communication frames may be monitored at a predetermined time interval, the ratio of occurrence of the ECU attribute in the communication may be calculated, and when the ratio of occurrence of the ECU attribute changes abruptly, the anomaly detection ECU may determine that there is an anomaly. With this anomaly detection method, when an automobile driving autonomously is under a DoS attack from an external network, for example, a time-series change can be observed such an abrupt decrease in the ratio of communication of the ECU having the powertrain and ADAS attributes and an abrupt increase in the ratio of communication of the ECU having the connectivity attribute; therefore, the occurrence of an anomaly in the in-vehicle network can be detected, and the security is enhanced.

(6) In the above embodiment, anomaly detection ECU 400 uses one communication frame to determine whether the communication frame is anomalous, according to the combination of the attribute of the ECU at the source IP address and the attribute of the ECU at the destination IP address, for example, but anomaly detection ECU 400 may store, for each combination of attributes, the ratio between the attributes of the ECU at the communication counterpart IP address, and when communication having a ratio significantly different from the stored ratio is detected, determine that that there is an anomaly. For example, when the ECU has a sensor attribute and a body attribute, instead of storing information that communication with two types of ECUs that are an ECU having a brain attribute and a body attribute and an ECU having a brain attribute and a powertrain attribute is normal, but by storing information that 90% of frames are generated from communication with an ECU having a brain attribute and a body attribute and the remaining 10% of frames are generated from communication with an ECU having a brain attribute and a powertrain attribute, the anomaly detection ECU can determine that there is an anomaly when the ECU having a sensor attribute and a body attribute transmits frames to only the ECU having a brain attribute and a powertrain attribute; thus, the security is enhanced.

(7) In the above embodiment, the IP address and the attribute information of the ECU are stored in association and used for anomaly detection, but the attribute information may be stored in association with other identification information. For example, information corresponding to the MAC address of the ECU may be included in the frame so that the attribute information can be labeled on a per MAC address basis.

(8) In the above embodiment, the role attribute and the domain attribute of the ECU are defined, and one communication frame is used to determine whether the communication frame is anomalous, according to the combination of the attribute of the ECU at the source IP address and the attribute of the ECU at the destination IP address, for example, but the anomaly detection may be performed using only the role attribute defined for labeling or only the domain attribute defined for labeling. For example, three ECU role attributes, sensor/brain/actuator, may be defined for each ECU, and among the combinations of the attribute of the ECU at the source IP address and the attribute of the destination ECU, which combination is normal may be defined. The cost for calculation in the anomaly detection increases when complexity increases such as including more than one attribute; therefore, the combination of attributes to be used in the determination may be switched to a simple combination depending on the situation.

(9) In the above embodiment, a frame that causes a change in the in-vehicle network is detected and then the attribute of the ECU is set again, but the attribute of the ECU may be set again due to something other than the frame detection. For example, an input interface such as a button that can be reset actively by an operator may be prepared so that the resetting is available at any time. Alternatively, position information may be obtained using a global positioning system (GPS) function installed on the in-vehicle system, and when movement from an area where a vehicle-to-everything (V2X) function is available to an area where the V2X function is not available is detected, for example, the ECU attribute may be reset.

(10) The above embodiment has described an example in which the attribute information of the ECU is over-written and stored after the attribute is reset, but the overwriting may be skipped and two or more pieces of attribute information may be stored for each ECU in association with time at which the attribute is set. While it is conceivable that false detection may occur due to insufficient data in the attribute information of the ECU that has been reset, anomaly detection using the attri-bute information before resetting can provide an index for determining whether the result of the anomaly detection is correct.

(11) The above embodiment has described an example in which the frame transmitted or received by the central ECU is transferred to the anomaly detection ECU and the anomaly detection is performed, but this is not limiting. An anomaly detection function using the attribute of the ECU may be incorporated into the central ECU or the in-vehicle network may be divided in predetermined units and two or more in-vehicle networks may be provided.

(12) In the above embodiment, when the anomaly detec-tion ECU detects an anomalous frame, the alert noti-fication frame is transmitted to user interface ECU 300, but an alert or a log related to anomaly detection may be sent via TCU 100 to OTA server 30 located outside the vehicle and managed by a security supervisor.

FIG. 27 illustrates one example of a log related to anomaly detection that is to be reported to an OTA server located outside the vehicle. FIG. 27 shows that log ID which is serial ID of an anomaly detection log is 10001 and an anomaly code indicating the type of an anomaly is 0x01 (violation of an inter-ECU attribute communication rule). Detected details indicate that the ECU attributes of the source ECU are a sensor and ADAS, the ECU attributes of the destination ECU are an actuator and a body, and an anomalous combination of ECU attributes has been detected. Furthermore, the IP addresses and the ECU attri-butes of the source ECU and the destination ECU are indicated. Moreover, the figure shows the timestamp of a frame from which an anomaly has been detected, the mes-sage size of the frame, and the fact that the frame includes an original packet.

Figure 28:
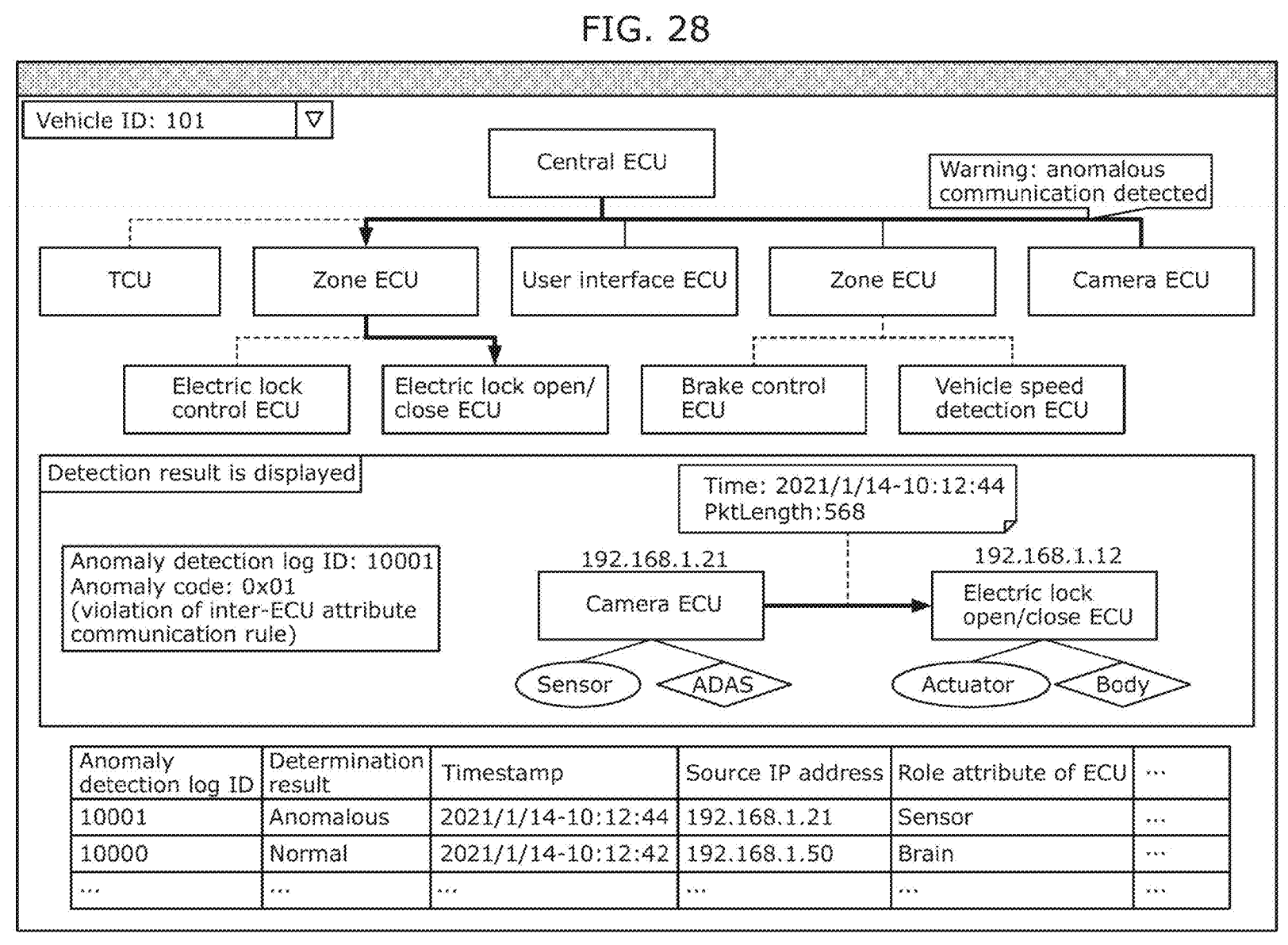

Furthermore, in order to facilitate analysis of the log related to the anomaly detection that has been reported to the OTA server, the anomaly detection result may be displayed on a graphical user interface connected to the OTA server. FIG. 28 illustrates one example of the anomaly detection result displayed on the graphical user interface. FIG. 28 shows that in a vehicle having vehicle ID 101, there is anomalous communication from the camera ECU to the electric lock open/close ECU, and the anomaly detector of the vehicle has detected the anomalous communication and transmitted the detection result to the OTA server. The vehicle ID, which is a number for identifying which vehicle has transmitted data, is set on the OTA server side using information that is unique to the vehicle and is included in data transmitted from the TCU. The displayed result is made up of three elements. At the top of the screen, a communi-cation path of the in-vehicle network in which the anomaly has been detected is highlighted with thick arrows, a com-munication path to which the camera ECU as a source may be connected according to the anomaly detection rule is drawn with thin lines, and a communication path to which the camera ECU as a source cannot be connected according to the anomaly detection rule is drawn with dotted lines. At the center of the screen, details of the anomaly detection result are displayed, visualizing an anomaly detection log such as that illustrated in FIG. 27. In order to show the basis for the anomaly determination, a portion of the figure is highlighted with thick lines or bold text according to the content of the anomaly code. In FIG. 28, the ECU attribute is highlighted because the inter-ECU attribute communica-tion rule is violated. At the bottom of the screen, the anomaly detection log received from the vehicle having vehicle ID 101 is organized and displayed in a table format. The first row of the table includes the elements of the anomaly detection log, and the second and following rows include the values of the anomaly detection log.

(13) Some or all of the structural elements included in each of the devices according to the above embodiment may be configured from a single system Large Scale Integration (LSI). A system LSI is a super-multifunc-tional LSI manufactured with a plurality of components integrated on a single chip, and is specifically a com-puter system configured of a microprocessor, read-only memory (ROM), and random-access memory (RAM), for example. A computer program is recorded in the RAM. The system LSI achieves its function as a result of the microprocessor operating according to the com-puter program. Furthermore, each unit of the structural elements included in each of the devices described above may be individually configured into a single chip, or some or all of the units may be configured into a single chip. Moreover, although a system LSI is mentioned here, the integrated circuit can also be called an IC, LSI, super LSI, and ultra LSI, depending on the level of integration. Furthermore, the method of circuit integration is not limited to LSI, and implementation through a dedicated circuit or a general-purpose pro-cessor is also possible. A field programmable gate array (FPGA) which allows programming after LSI manu-facturing or a reconfigurable processor which allows reconfiguration of the connections and settings of the circuit cells inside the LSI may also be used. In addition, depending on the emergence of circuit inte-gration technology that replaces LSI due to progress in semiconductor technology or other derivative technol-ogy, it is obvious that such technology may be used to integrate the function blocks. Possibilities in this regard include the application of biotechnology and the like.

(14) Some or all of the structural elements included in each of the devices described above may be imple-mented as a standalone module or an IC card that can be inserted into and removed from the device. The IC card or the module is a computer system made up of a microprocessor, ROM, RAM, and so on. The IC card or the module may include the aforementioned super-multifunctional LSI. The IC card or the module achieves its functions as a result of the microprocessor operating according to the computer program. The IC card and the module may be tamper-proof.

(15) One embodiment of the present disclosure may be a program (computer program) for implementing the anomaly detection method using a computer or may be a digital signal of the computer program. Furthermore, one embodiment of the present disclosure may be the computer program or the digital signal recorded on recording media readable by a computer, such as a flexible disk, a hard disk, compact disc read-only memory (CD-ROM), a magneto-optical disc (MO), a digital versatile disc (DVD), a DVD-ROM, a DVD-RAM, a Blu-ray (registered trademark) disc (BD), or semiconductor memory, for example. The present disclosure may also be the digital signal recorded on these recoding media. Furthermore, one embodiment of the present disclosure may be the computer program or the digital signal that is transmitted via an electrical communication line, a wireless or wired communication line, a network represented by the Internet, data broadcasting, or the like. Furthermore, one embodiment of the present disclosure may be a computer system including a microprocessor and memory. The memory may have the computer program recorded thereon, and the microprocessor may operate according to the computer program. Moreover, by transferring the recording medium having the program or the digital signal recorded thereon or by transferring the program or the digital signal via the network or the like, the present disclosure may be implemented by a different independent computer system.

(16) Forms configured by arbitrarily combining structural elements and functions in the above embodiment and the above variations are included within the scope of the present disclosure.

INDUSTRIAL APPLICABILITY

With the present disclosure, in an in-vehicle network system, anomalous communication can be detected according to a change in the in-vehicle network that occurs due to system update, addition and change of functions, and so on; thus, it is possible to improve vehicle safety.

The invention claimed is:

1. An anomaly detection device that detects an anomaly in an in-vehicle network system including two or more electronic control units and one or more networks, the anomaly detection device comprising:

an electronic control unit (ECU) attribute storage in which attributes of the two or more electronic control units are stored, each of the attributes being set for a corresponding one of the two or more electronic control units;

a processor; and a memory including a program that, when executed by the processor, causes the processor to perform functions, the functions including:

receiving and transmitting a message on the one or more networks; and detecting an anomalous communication by using an attribute of a message source electronic control unit or an attribute of a message destination electronic control unit among the attributes stored in the ECU attribute storage, the message source electronic control unit being one of the two or more electronic control units that is a source of the message, the message destination electronic control unit being one of the two or more electronic control units that is a destination of the message, wherein each of the attributes stored in the ECU attribute storage indicates at least one of a function of a corresponding one of the two or more electronic control units or a type of information that is handled by the corresponding one of the two or more electronic control units, and each of the attributes at least represents a functional category shared by a set of one or more of the electronic control units.

2. The anomaly detection device according to claim 1, wherein each of the attributes stored in the ECU attribute storage indicates the function of the corresponding one of the two or more electronic control units that operates in the in-vehicle network system, and the attributes stored in the ECU attribute storage include any one of:

a sensor attribute indicating that the corresponding one of the two or more electronic control units includes a first function of sensing information on at least one of an inside or an outside of a vehicle;

a brain attribute indicating that the corresponding one of the two or more electronic control units includes a second function of processing the sensing information and providing a control instruction; or an actuator attribute indicating that the corresponding one of the two or more electronic control units includes a third function of performing control according to the control instruction.

3. The anomaly detection device according to claim 2, wherein in the in-vehicle network system, messages are transferred by service-oriented communication, the anomaly detection device further comprises:

a communication log storage in which the message received by processor is stored, the functions further include setting the attribute of each of the two or more electronic control units to be stored into the ECU attribute storage, and by referring to the message stored in the communication log storage, the processor determines, from a message type included in the message, whether each of the two or more electronic control units is on a server side or a client side, and determines the attribute of each of the two or more electronic control units according to a ratio between server communication and client communication.

4. The anomaly detection device according to claim 3, wherein the processor determines the attribute of each of the two or more electronic control units when one of the following conditions is satisfied: (i) a predetermined time has elapsed since determination of the attribute of each of the two or more electronic control units; or (ii) the processor has received a second message that causes a change in a communication tendency of the one or more networks.

5. The anomaly detection device according to claim 4, wherein the second message that causes the change in the communication tendency of the one or more networks is: generated upon obtaining and installing data from a network or a server different from the in-vehicle network system; or generated upon changing, deleting, or updating a function setting of the in-vehicle network system.

6. The anomaly detection device according to claim 2, further comprising:

a communication log storage in which the message received by the processor is stored, wherein the functions further include setting, by referring to the message stored in the communication log storage, the attribute of each of the two or more electronic control units stored in the ECU attribute storage, and by referring to the ECU attribute storage and the message stored in the communication log storage, the processor determines a first attribute of a first electronic control unit according to a frequency of occurrence of the attribute of one of the two or more electronic control units with which the first electronic control unit communicates, the first electronic control unit being one of the two or more electronic control units.

7. The anomaly detection device according to claim 6, wherein the processor calculates, from the message stored in the communication log storage, the frequency of occurrence of the attribute of the one of the two or more electronic control units with which the first electronic control unit communicates, and the processor refers to a second frequency of occurrence of the attribute of the first electronic control unit stored in the ECU attribute storage, and when the frequency of occurrence calculated is different by more than a predetermined reference from the second frequency of occurrence referred to, determines that communication performed by the first electronic control unit is anomalous.

8. The anomaly detection device according to claim 1, wherein each of the attributes stored in the ECU attribute storage, in addition representing the functional category, indicates the type of information that is handled by the corresponding one of the two or more electronic control units in the in-vehicle network system, and the attributes stored in the ECU attribute storage include any one of:

a powertrain attribute indicating handling of first control information regarding travel of a vehicle;

an infotainment attribute indicating handling of information regarding a notification of a state of the vehicle to an operator;

a body attribute indicating handling of second control information about a body of the vehicle;

an advanced driver-assistance system (ADAS) attribute indicating handling of information regarding an advanced driver assist function that assists or replaces a vehicle operation being performed by the operator; or a connectivity attribute indicating handling of information obtained from outside of the one or more networks.

9. The anomaly detection device according to claim 1, wherein the processor determines, based on a combination of the attribute of the message source electronic control unit and the attribute of the message destination electronic control unit, whether the message received by the processor is anomalous.

10. The anomaly detection device according to claim 9, further comprising:

a communication log storage in which the message received by the processor is stored, wherein the processor:

specifies, by referring to the ECU attribute storage and the message stored in the communication log storage, a relationship indicating a combination of the attribute of the message source electronic control unit and the attribute of the message destination electronic control unit between which the message has been transferred;

determines that a newly received message is normal when the newly received message is transferred between electronic control units that are included in the two or more electronic control units and include the combination of the attributes indicated in the relationship; and determines that the newly received message is anomalous when the newly received message is transferred between electronic control units that are included the two or more electronic control units and include a combination of attributes different from the combination indicated in the relationship.

11. The anomaly detection device according to claim 1, wherein the processor determines, based on a relationship between the attribute of the message source electronic control unit or the attribute of the message destination electronic control unit and information included in the message received by the processor, whether the message received by the processor is anomalous.

12. The anomaly detection device according to claim 11, wherein in the in-vehicle network system, messages are transferred by service-oriented communication, and the information included in the message received by the processor is information stored in a Scalable service-Oriented MiddlewarE over IP (SOME/IP) communication message format.

13. An anomaly detection method for detecting an anomaly in an in-vehicle network system including two or more electronic control units and one or more networks, the anomaly detection method comprising:

transmitting and receiving a message on the one or more networks; and detecting anomalous communication by using an attribute of a message source electronic control unit or an attribute of a message destination electronic control unit among attributes of the two or more electronic control units, the message source electronic control unit being one of the two or more electronic control units that is a source of the message, the message destination electronic control unit being one of the two or more electronic control units that is a destination of the message, each of the attributes being set for a corresponding one of the two or more electronic control units, wherein each of the attributes indicates at least one of a function of a corresponding one of the two or more electronic control units or a type of information that is handled by the corresponding one of the two or more electronic control units, and each of the attributes at least represents a functional category shared by a set of one or more of the electronic control units.

* * * * *